United States Patent
Haas et al.

(10) Patent No.: US 9,395,943 B2
(45) Date of Patent: Jul. 19, 2016

(54) METHOD TO OPERATE A CONTROL PANEL FOR A PRODUCTION SYSTEM, AS WELL AS A CONTROL SYSTEM FOR A PRODUCTION SYSTEM

(71) Applicant: Oce Printing Systems GmbH & Co. KG, Poing (DE)

(72) Inventors: Andreas Haas, Armstorf (DE); Norbert Linkel, Isen (DE); Harald Keicher, Isen (DE)

(73) Assignee: Oce Printing Systems GmbH & Co. KG, Poing (DE)

( * ) Notice: Subject to any disclaimer, the term of this patent is extended or adjusted under 35 U.S.C. 154(b) by 0 days.

(21) Appl. No.: 14/878,426

(22) Filed: Oct. 8, 2015

(65) Prior Publication Data

US 2016/0103643 A1    Apr. 14, 2016

(30) Foreign Application Priority Data

Oct. 8, 2014   (DE) .......................... 10 2014 114 586

(51) Int. Cl.
*B41J 29/38*   (2006.01)
*G06F 3/12*   (2006.01)
*H04N 1/00*   (2006.01)

(52) U.S. Cl.
CPC ............ *G06F 3/1253* (2013.01); *G06F 3/1246* (2013.01); *G06F 3/1285* (2013.01); *G06F 3/1287* (2013.01); *H04N 1/00204* (2013.01); *H04N 1/00238* (2013.01); *H04N 1/00464* (2013.01)

(58) Field of Classification Search
CPC .......... H04N 1/00204; H04N 1/00209; H04N 1/00214; H04N 1/00233; H04N 1/00238; H04N 1/00312; G06F 3/1287; G06F 3/1246; G06F 3/12; G06F 3/129; G06F 3/1248; G06F 3/1285; B41J 29/393; B41J 2/04543
See application file for complete search history.

(56) References Cited

U.S. PATENT DOCUMENTS

| | | | | |
|---|---|---|---|---|
| 8,051,379 B2 * | 11/2011 | Iwata | ................... | G06K 15/007 715/744 |
| 8,356,084 B2 * | 1/2013 | Yamamoto | ............ | G06F 3/1454 709/217 |
| 8,970,876 B2 * | 3/2015 | Takahashi | ............. | G06F 9/5027 358/1.15 |
| 9,191,539 B2 * | 11/2015 | Yamada | .................... | G06F 9/50 |
| 2003/0014368 A1 | 1/2003 | Leurig et al. | | |
| 2012/0131473 A1 | 5/2012 | Biron, III | | |
| 2014/0126715 A1 | 5/2014 | Lum et al. | | |

FOREIGN PATENT DOCUMENTS

DE    3614744 A1   11/1987
DE    29720991 U1   1/1998

* cited by examiner

*Primary Examiner* — Anh T. N. Vo
(74) *Attorney, Agent, or Firm* — Schiff Hardin LLP

(57) ABSTRACT

In a method for operating a control panel for a production system in particular for printing system, a control system is provided comprising a main computer. The main computer is connected via a data connection with one or more client computers on which a browser is executed. The control panel for the production system is displayed in the respective browser. Via an operation of a user at the control panel, an action request is triggered at a web user interface with which an action is requested at the main computer. Upon every action request, the web user interface checks according to predetermined rules whether this action is allowed, and blocks the action if it is not allowed.

16 Claims, 12 Drawing Sheets

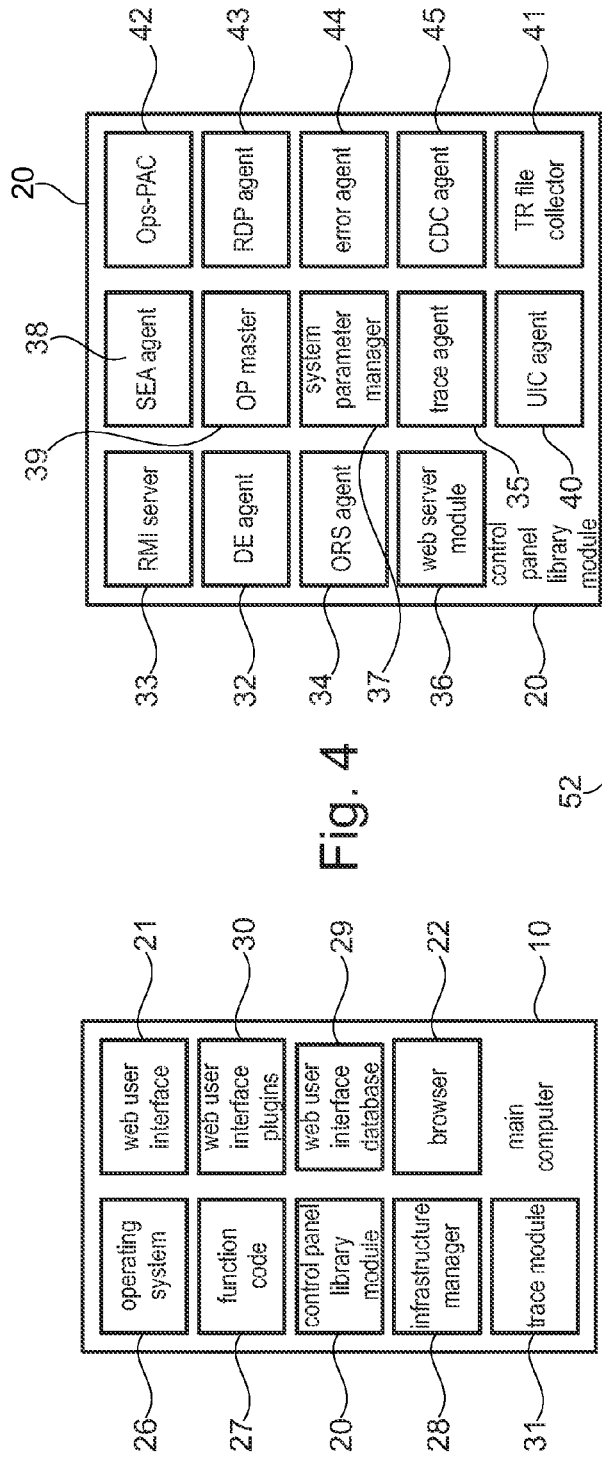
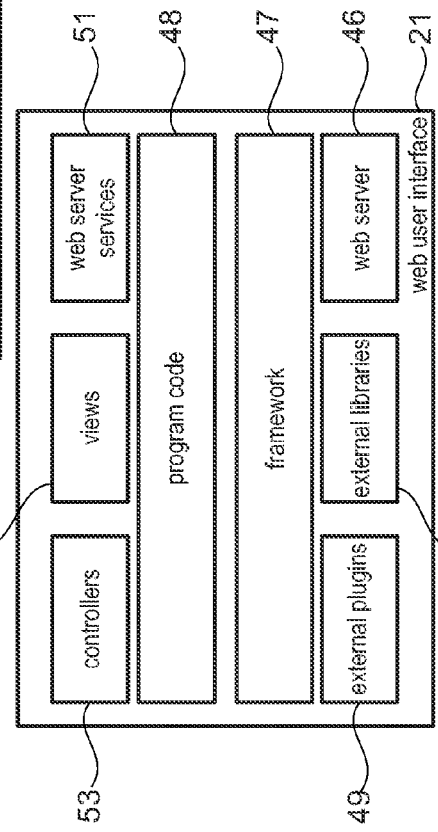

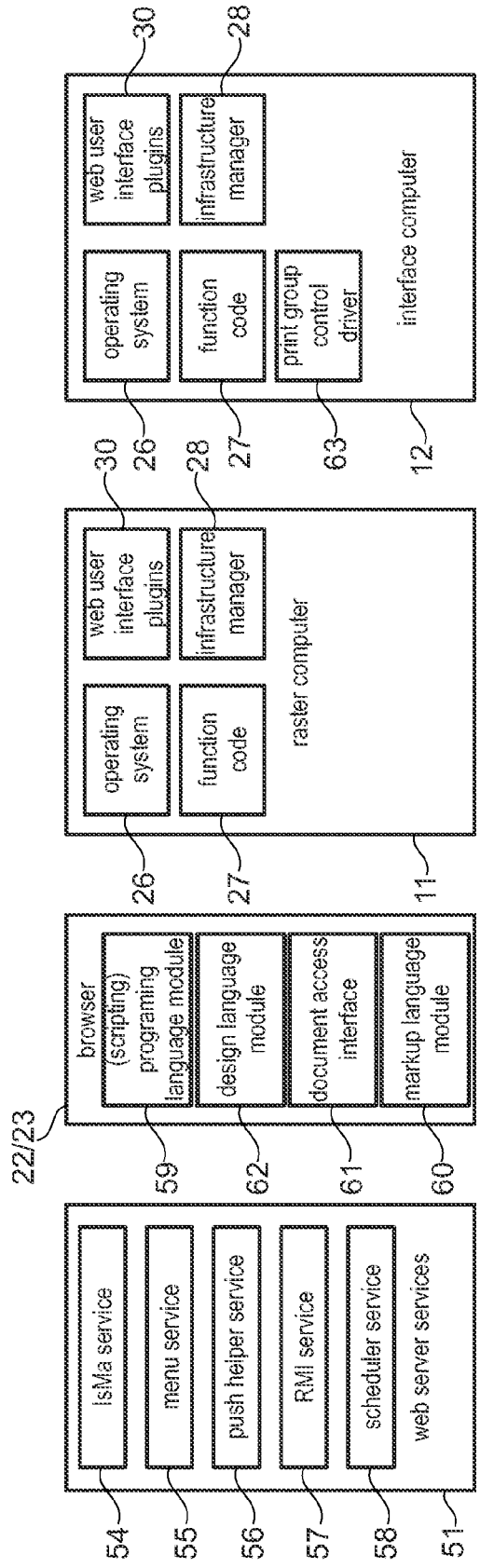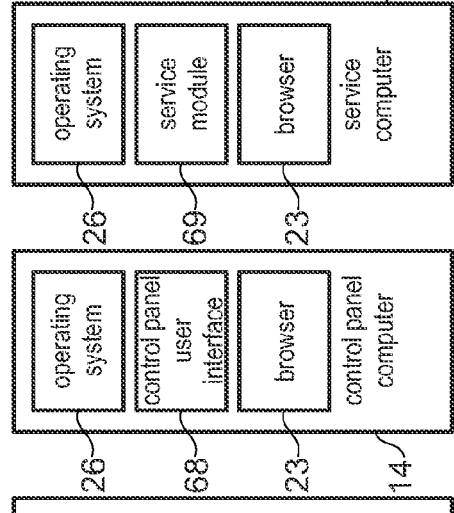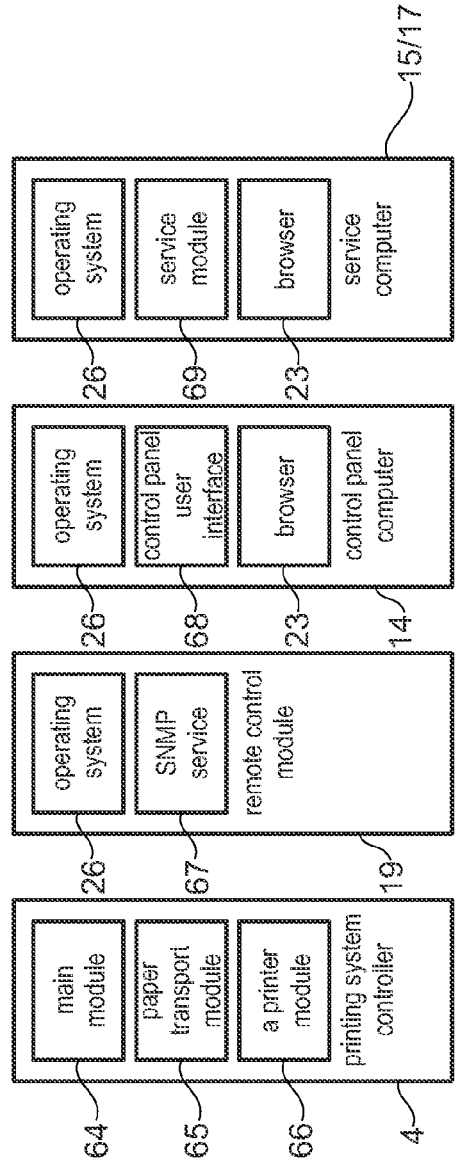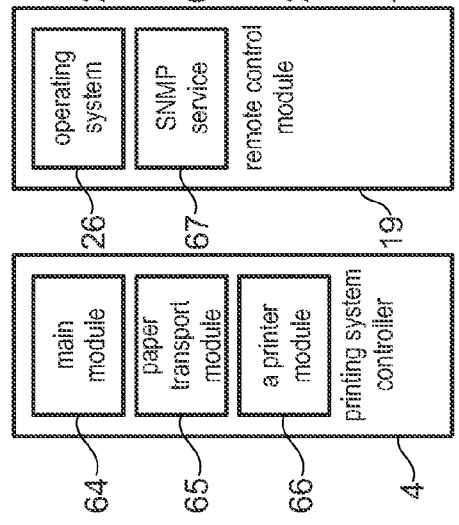

| Display object ID | Session ID | Window ID | User ID | Data source ID | Focus (window active) |
| --- | --- | --- | --- | --- | --- |
| a | 1 | 1 | A | D1 | true |
| b | 1 | 1 | A | D2 | true |
| c | 1 | 1 | A | D3 | true |
| d | 1 | 2 | A | D4 | false |
| e | 1 | 2 | A | D5 | false |
| f | 1 | 2 | A | 0 | false |
| g | 2 | 1 | A | D1 | true |
| h | 2 | 1 | A | D5 | true |
| i | 2 | 1 | A | 0 | true |
| j | 3 | 1 | B | 0 | false |
| k | 3 | 1 | B | D2 | false |
| l | 3 | 1 | B | 0 | false |
| m | 3 | 2 | B | 0 | true |
| n | 3 | 2 | B | 0 | true |
| o | 3 | 2 | B | D3 | true |
| p | 3 | 2 | B | D4 | true |

FIG. 14

METHOD TO OPERATE A CONTROL PANEL FOR A PRODUCTION SYSTEM, AS WELL AS A CONTROL SYSTEM FOR A PRODUCTION SYSTEM

RELATED APPLICATION

The present application is related to an application titled "METHOD TO OPERATE A CONTROL PANEL FOR A PRODUCTION SYSTEM, AS WELL AS A CONTROL SYSTEM FOR A PRODUCTION SYSTEM" Inventors Haas et al, filed Oct. 8, 2015, Case No. P15,0223 (27008-0150) and to an application titled "METHOD TO OPERATE A CONTROL PANEL FOR A PRODUCTION SYSTEM, AS WELL AS A CONTROL SYSTEM FOR A PRODUCTION SYSTEM", Inventors Haas et al., filed Oct. 8, 2015, Case No. P15,0227 (27008-0151).

BACKGROUND

The present exemplary embodiments concern a method to operate a control panel for a production system, as well as a control system for a production system. In particular, the present exemplary embodiments concern a method to operate a control panel for a printing system as well as a control system for a printing system.

A computer for a printing machine—in particular a sheet offset printing machine—arises from DE 297 20 991 U1, in which the printing machine has multiple computers which are connected with one another via a bus. At least one of the computers has a display and input device. This one computer is a portable computer that is connected with the printing machine by means of a radio interface and serves to control the printing machine.

An additional device to control a printing machine arises from DE 36 14 744 C2, in which an electronic control unit is designed to be portable. The signals between the portable electronic control unit and a stationary receiver of the printing machine are transmitted in encoded form.

The use of a WebRTC server (Web real-time communication system), which enables a browser to implement a bidirectional data exchange in real time by means of a JavaScript API (JavaScript application programming interface), arises from US 2014/0126715 A1. With this, microphones, cameras and loudspeakers may be controlled to exchange audio and video information via the Internet. A user does not need to load any additional software and execute it in the browser.

In US 2012/0131473 A1 it is described how a Web service script on a client computer may be manipulated, wherein then a correspondingly modified Web service is compiled into an executable code on a server. This executable code is executed and generates a corresponding website that is sent back to the client computer.

There are various text-based markup languages for structuring and semantic markup of contents such as texts, images and hyperlinks in documents. HTML 4.01, whose specification was published in December 1999, is such a markup language, for example. HTML version 5 is in development.

SUMMARY

It is an object to achieve a method for operating a control panel for a production system and a control system for a production system with which a control panel may be reliably operated over a data connection with low transmission rate, wherein in particular multiple control panels may be provided simultaneously.

In a method or system for operating a control panel for a production system wherein the production system has a control system comprising a main computer connected via a data connection with at least one client computer on which a respective browser is installed and executed, a control panel library module is provided and executed on the main computer to generate and provide a control panel for the production system. The control panel is transmitted as a markup language file from the main computer to the respective browser and the control panel is executed in the browser to present the control panel. The markup language file is transmitted from the main computer to the at least one client computer by means of a web user interface installed and executed on the main computer. By an operation of a user at the control panel, an action request is triggered at the web user interface with which an action is requested at the main computer. Upon every action request, the web user interface checks according to predetermined rules if said action request is allowed, and if it is not allowed the action request is blocked.

BRIEF DESCRIPTION OF THE DRAWINGS

FIG. 3 through FIG. 13 show schematic hardware and software components of a control system or of client computers;

FIG. 14 shows a reference table;

DESCRIPTION OF EXEMPLARY EMBODIMENTS

Figure 1:
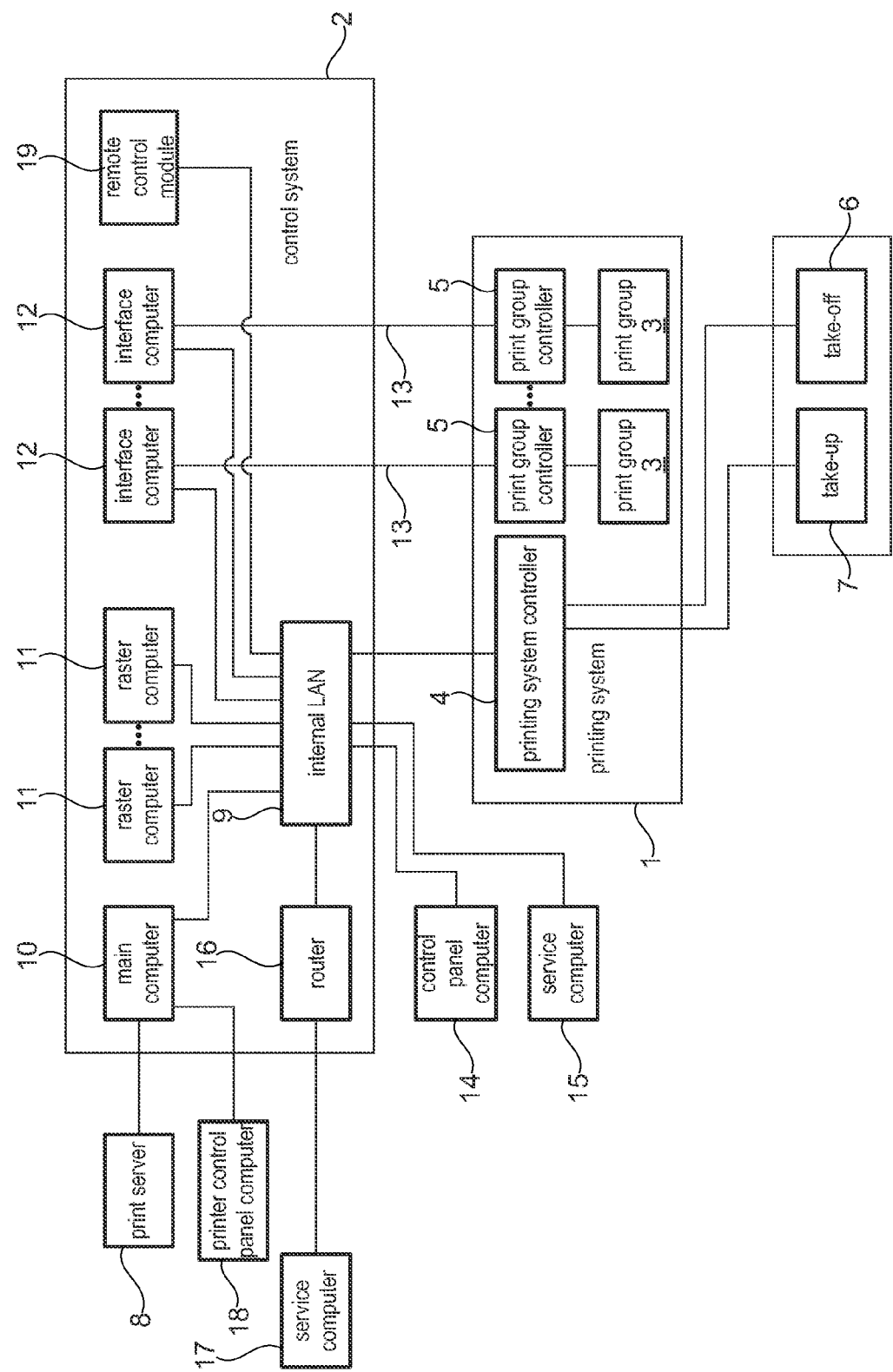
FIG. 1 illustrates schematically in a block diagram, a printer, a control system and apparatuses connected therewith.

For the purposes of promoting an understanding of the principles of the invention, reference will now be made to the preferred exemplary embodiments/best mode illustrated in the drawings and specific language will be used to describe the same. It will nevertheless be understood that no limitation of the scope of the of the invention is thereby intended, and such alterations and further modifications in the illustrated embodiments and such further applications of the principles of the invention as illustrated as would normally occur to one skilled in the art to which the invention relates are included herein.

The method according to one exemplary embodiment for the operation of a control panel is provided for a production system, in particular for a printing system. The production system has a control that comprises a main computer. The main computer is connected via a data connection with one or more client computers at which a browser is executed. A control panel library module with which a control panel for the production system is generated and made available is installed at the main computer and is executed there. The control panel is transmitted as a markup language file from the main computer to the respective browser and is executed in the browser to present the control panel.

A first aspect of one exemplary embodiment is characterized in that the control panel has one or more display objects that are respectively a self-contained element of said control panel that serve for the display of a specific value of a respective parameter. At the main computer, a reference table is stored with which a relationship is established between each display object and a data source for the specific value shown in the display object. Given a change to the specific value of the data source, the main computer transmits only this changed specific value to the corresponding display object.

Since only a value—instead of the entire markup language file—is transmitted from the main computer to the respective browser if the corresponding value changes, the data volume that is to be transferred if a corresponding value is updated at the control panel is very small.

Given conventional methods in which markup language files are executed at a browser to display an interface, an updating of the interface takes place via transmission of the entire markup language file. By providing multiple, individually exchangeable display objects and the reference table with which a relation is established between the display object and a corresponding data source, given a change of the value of the data source this changed value may be associated with the display object, and it is sufficient to transfer only this changed value, which is then updated accordingly in the control panel.

A change to one display object may preferably be executed independently of changes to other display objects.

A control panel is a user interface for the operation of a production system, which user interface is displayed on a display of a computer.

According to a second aspect of one exemplary embodiment, a method is provided for operating a control panel for a production system, in particular a printing system. The production system has a control system that comprises a main computer. The main computer is connected via a data connection with one or more client computers on which a browser is respectively installed and executable. A control panel library module is installed on the main computer, and it is executed in order to generate and make available a control panel for the production system, wherein the control panel is transmitted as a markup language file from the main computer to the respective browser and is executed in the browser to present the control panel. Values of the parameters displayed at the control panel are respectively updated only after the expiration of predetermined wait time periods.

Due to the provision of wait times for the transfer of values of specific parameters, every change of a value of a parameter is not transmitted immediately but rather only after expiration of a wait time. If a value of a parameter should change multiple times within the wait period, only the value according to the last change is then transferred within the wait time. This method is based on the realization that most sensor devices record values with a sampling frequency that is significantly higher than that of a user, who receives the values with human senses. A delay due to a wait time of 0.1 to 0.3 s is barely perceptible to a user. On the other hand, the number of values to be transferred is significantly reduced, such that the data volume to be transferred is reduced accordingly. If parameters are shown that in principle vary slowly (temperatures, for example), then even a wait time of a few seconds is sufficient. Multiple client computers may hereby be connected to a main computer simply via a data connection with low transfer rate, wherein it is ensured that the updated values are transmitted to all client computers with the desired frequency, corresponding to the predetermined wait time. This allows a reliable updating of a plurality of values at one or more client computers.

Upon expiration of a wait time, the values are preferably transferred only if a change to the corresponding value is present.

The values of different parameters are preferably updated with different wait times, wherein rapidly changing parameters are updated with correspondingly shorter wait times than slowly changing parameters. The wait times are typically in the range from 0.1 s to 10 s.

A browser buffer for every active browser is preferably stored at the main computer. Values for a specific parameter that are stored in the browser buffer are overwritten with changing values of this parameter. The browser buffer hereby contains only a single value for each parameter, namely the most recent value supplied by the corresponding data source.

In the reference table, a session ID may be stored for every display object, wherein the session ID respectively references a session of one of the client computers in which one of the browsers that presents the respective display object is executed. A unique relationship is hereby established between the display objects and the sessions or the corresponding browser.

The reference table preferably has window IDs that respectively uniquely reference a window of one of the browsers that is executed in the session (which is determined by the session ID), wherein the respective display object is presented in the window. Such a reference table allows a unique association of the display objects with different windows (tabs) of a browser.

Furthermore, with regard to every display object it may be stored in the reference table whether the browser presenting the display object—or the window of the browser that is presenting the display object—is shown in the foreground and/or whether the focus (which marks a browser or the window of a browser as active) is on the browser or the window of the browser. It is hereby indicated in the reference table which display objects are presented in the foreground or with the focus, such that these display objects may be updated with a higher priority than the other display objects. It may also be appropriate to update only the display objects that are shown in the foreground or which have focus, and to not update the other display objects. The data quantity to be transferred may also hereby be reduced.

Given a change to the value of a parameter by a data source, the changed value is transmitted to all display objects linked with the data source.

The markup language file may be transmitted from the main computer to one of the client computers by means of a web user interface that is installed and executable at the main computer. The updates of display objects (wherein the entire display object and also merely individual values of the display objects may be updated) are transmitted by means of commands from the web user interface to the client computer, wherein the commands are executed by an embedded program code that is present on the client computer and transmitted with the markup language file. These commands may include instructions for the presentation of defined graphical objects of the corresponding display objects, and also display parameters or display values or values received from the data sources that are to be relayed. Both the commands and the program code may include elements of a scripting language, in particular JavaScript elements.

The control panel is preferably designed to implement changes to the production system. These changes may pertain to the adjustment of specific parameters (in particular production parameters), and to the execution of action requests or control commands, for example the startup or deactivation of individual elements of the production system.

A third aspect of one exemplary embodiment is characterized in that, with the control panel executed in the browser, a ticket request may be sent to the web user interface, wherein upon a ticket request the web user interface checks whether it is authorized to assign a session ticket to a browser and whether the session ticket is available; and—if both are the case—the web user interface then assigns the session ticket to the browser placing the ticket request.

In this method, the web user interface initially checks whether it is authorized to assign the session ticket at all, and if this is the case it then assigns the session ticket to one of the browsers.

Whether the web interface is authorized to assign a session ticket may depend on whether a ticket server at the main computer assigns an access ticket that is authorized to set changes to the production system by means of an input device connected with said main computer, wherein the web user interface represents such an input device. In checking whether the web user interface is authorized to assign a session ticket, it checks whether it possesses the access ticket or may receive one from the ticket server.

On the other hand, the web interface may also be authorized to assign a session ticket if the production system is in a standby mode. In the test as to whether the web user interface is authorized to assign a session ticket, it is thus checked whether the production system is in a standby mode in which only basic settings of the production system may be adjusted, and in which a session ticket may be assigned to a browser to adjust these basic settings. Such basic settings include general settings regarding the control panel itself. They may also pertain to fundamental settings regarding the production apparatus that are not directly connected with the production process.

A session ID is associated with every markup language file executed in a browser, and using the session ID the web user interface cyclically checks whether the respective browser is still open and capable of reacting and—when it is established that a browser to which the session ticket is assigned no longer reacts or is closed—the session ticket is withdrawn from this browser. It is hereby ensured that—given a crash of a browser—the session ticket may be promptly passed on to a further browser so that the access to the production apparatus is ensured.

If multiple windows in which a respective browser is executed may be opened at a client computer, then each window is identified by a window ID, and the session ticket is associated with an individual window so that changes to the production system may be made by means of the web user interface.

The web user interface is preferably cyclically checked using the window ID as to whether the windows are still open and capable of reacting, and if it is established that a window to which the session ticket is assigned no longer reacts or is closed, then the session ticket is withdrawn from this window. It is hereby ensured that the session ticket may be promptly forwarded upon the crash of a window so that the access to the production apparatus is ensured.

The web user interface and the respective browser preferably communicate by means of web sockets, wherein one of the web sockets is linked to the web user interface and another of the web sockets is linked to the browser, such that a permanent logical data connection is formed between the web user interface and the respective browser. A permanent logical data connection hereby exists, such that the information may be exchanged between the web user interface and the respective browser without appreciable delay.

Upon every ticket request, the web user interface preferably checks whether the session ticket is assigned and—if this is the case—then the ticket request is refused, and—if this is not the case—then the web user interface checks whether it possesses the access ticket or may receive the access ticket from the ticket server and—if this is the case—it assigns the session ticket to the browser posing the ticket request; otherwise, the ticket request is refused.

An operation by a user at the control panel may trigger an action request at the web user interface, with which an action is requested at the main computer.

A ticket is a logical marking that identifies an authorization for control access or write access to a resource. A ticket is linked to a session; to a window of a browser; to a software component (to a browser, for example); or to a hardware component (for example to an apparatus, a device or installation). A ticket may be assigned, withdrawn or returned or released. Only one instance of a ticket exists.

A fourth aspect of one exemplary embodiment is characterized in that, upon every action request, the web interface checks according to predetermined rules whether this action is allowed, and blocks the action if it is not allowed. A control panel presented in a browser may simply be manipulated or copied since the markup language file is simply not accessible to the user of the browser. However, in that every action request to the computer is checked, a manipulation at the client computer has no effect if the authorization to execute the action is not present. Therefore, manipulations at the client computer normally have no effect. Conversely, manipulations at the main computer are significantly more difficult. A high level of security is hereby achieved, although a browser is used to present the control panel.

The actions may include both menu actions that are executed at the web user interface and control actions with which settings at the printing system may be modified.

At every action request, the web user interface preferably checks whether this action request is possible via the control panel presented in the browser, and blocks the action if the action request is not possible via the control panel.

Using a rule system, the control panel module library may check whether specific control actions may be executed in the respective current state of the production system, and if this is not the case then these control actions are blocked.

The predetermined rules include one or more of the following security rules:
  action request may be made only by authorized persons or devices;
  action request may only be made by persons or devices that have sufficient access rights;
  action request may only be made if the respective browser presents a display object that is suitable for execution of the action;
  action request may only be made if the production apparatus status allows for this.

Upon reviewing an action request, the identification of the browser, of a user, of a session and/or of a window in which the control panel is executed may be extracted, and using this identification a user may be identified who has triggered the action request, wherein the rights associated with the user are determined and, using these rights, a check is made as to whether the requested action may be executed.

Upon every initialization of the control panel in the browser, a respective user preferably has to register or be authorized, wherein upon reviewing an action request, the identification of the browser, of a user, of a session and/or of a window in which the control panel is executed is extracted, and using this identification a user who has triggered the action request is identified, wherein a check is made as to whether the user is properly registered or authorized. The registration or authorization may take place by means of a user name and a password. However, it is also possible to use other methods for registration and authorization, for example methods based on biometric data.

The control panel may have one or more display objects that are respectively a self-contained element of the control panel that serves for the display of a specific value of a parameter. A reference table is then stored at the main computer, with which reference table a relation is established between each display object and a browser and/or window and/or session. Using the reference table, a check is made as to which display objects are displayed in the respective browser and thus are operable, and the action is blocked if it is established that the display object from which the action request arises is not presented.

An error message or warning message may be transmitted to the browser from which the action request has been initiated, and/or to another control panel (in particular to a user with greater rights than that user who has initiated the action request). If the security rules are not complied with, then it may be appropriate to inform predetermined persons (for example an operator or an administrator) about this. This may take place via the control panel or also via another messaging means (email, SMS etc.).

The different aspects may be executed in a method individually or in combination.

A control system according to one exemplary embodiment for a production system (in particular for a printing system) has a main computer. The main computer is connected via a data connection with one or more client computers on which a browser is respectively installed and may be executed. At the main computer, a control panel library with which a control panel for the production system is generated and made available is installed and executable. The control panel is transmitted as a markup language file from the main computer to the respective browser and is executed in the browser to present the control panel. The control system is designed to implement the method explained above.

Furthermore, one exemplary embodiment concerns a production system with such a control system and a production system. The production apparatus is in particular a digital high-capacity printing system. Digital high-capacity printing systems may be designed as electrophotographic printing systems, inkjet printing systems and liquid toner printing systems.

Liquid toner printing systems are printing systems in which toner particles are applied onto a recording medium to be printed with the aid of a liquid developer. For this, a latent charge image of a charge image carrier is inked by means of electrophoresis, with the aid of a liquid developer. The toner image that is created in such a manner is transferred onto the recording medium indirectly via a transfer element or directly. The liquid developer has toner particles and carrier fluid in a desired ratio. Mineral oil is preferably used as a carrier fluid. In order to provide the toner particles with an electrostatic charge, charge control substances are added to the liquid developer. Further additives are additionally added, for example in order to achieve the desired viscosity or a desired drying behavior of the liquid developer.

Such digital printers are known from DE 10 2010 015 985 A1, DE 10 2008 048 256 A1, DE 10 2009 060 334 A1 or DE 10 2012 111 791 A1, for example.

One exemplary embodiment of a digital printer comprises a printing system 1 and a control system 2 (FIG. 1).

Figure 21:
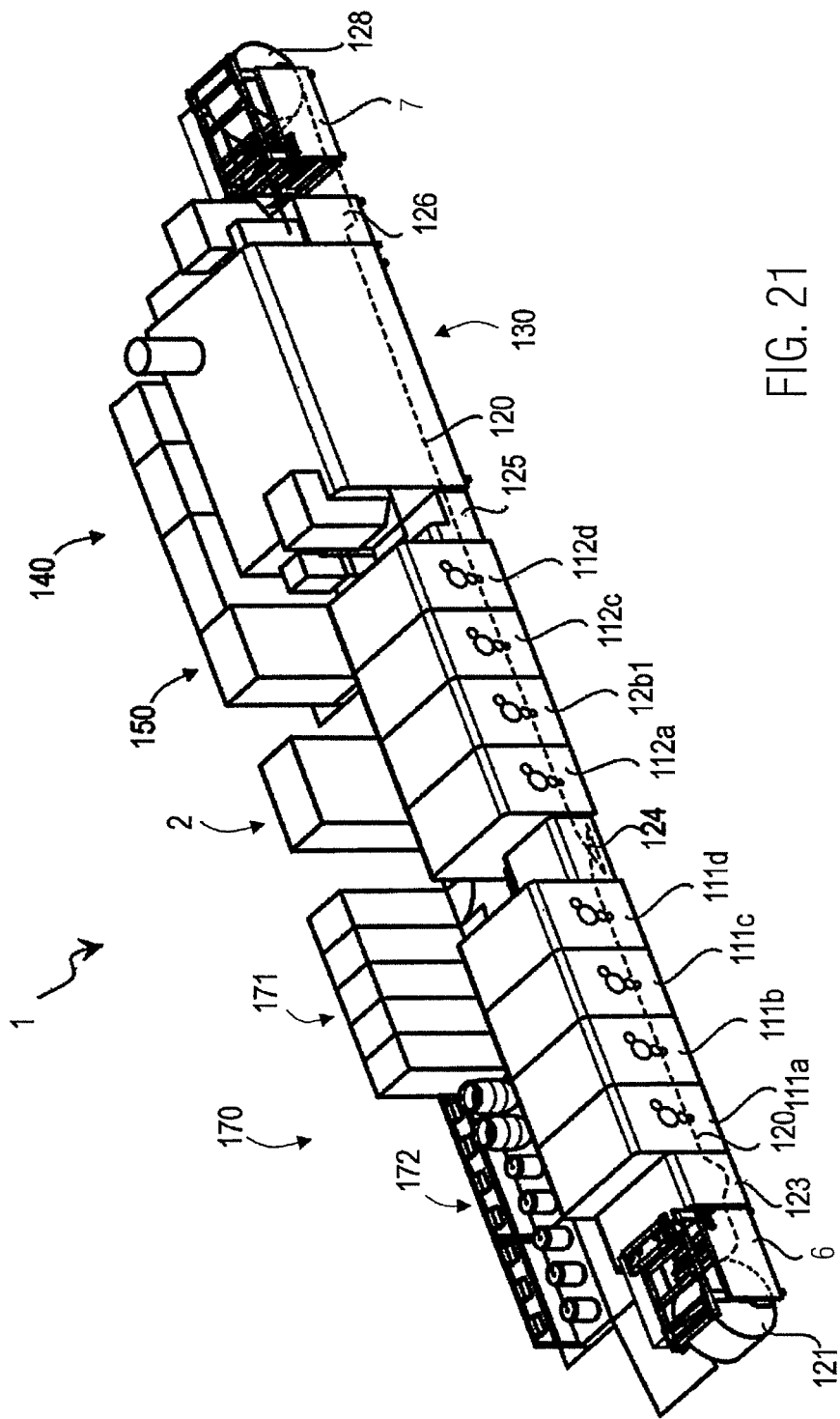
FIG. 21 illustrates a view of a digital printer with an example configuration of the digital printer.

According to FIG. 21, as a printing system 1a digital printer for printing to a recording medium 120 comprises one or more print groups 111a-111d and 112a-112d that print a toner image (print image) onto the recording medium 120. As shown, a web-shaped recording medium 120 (as a recording medium 120) is unrolled from a roller 121 with the aid of a take-off 6 and is supplied to the first print group 111a. The print image is fixed on the recording medium 120 in a fixer unit 130. The recording medium 120 may subsequently be taken up on a roller 128 with the aid of a take-up 7. Such a configuration is also designated as a roll-to-roll printer.

In the preferred configuration shown in FIG. 21, the web-shaped recording medium 120 is printed in full color on the front side with four print groups 111a through 111d and on the back side with four print groups 112a through 112d (what is known as a 4/4 configuration). For this, the recording medium 120 is unwound from the roller 121 by the take-off 6 and is supplied via an optional conditioning group 123 to the first print group 111a. The recording medium 120 may be pretreated or coated with a suitable substance in the conditioning group 123. Wax or chemically equivalent substances may preferably be used as a coating substance (also designated as a primer).

This substance may be applied over the entire area or only to the locations of the recording medium 120 that are to be printed to later, in order to prepare the recording medium 120 for printing and/or to affect the absorption property of the recording medium 120 upon application of the print image. It is therefore prevented that the toner particles or carrier fluid that are applied later do not penetrate too significantly into the recording medium 120, but rather remain essentially on the surface (color quality and image quality is thereby improved).

The recording medium 120 is subsequently initially supplied to the first print groups 111a through 111d in order, in which print groups only the front side is printed to. Each print group 111a-111d typically prints to the recording medium 120 in a different color or even with different toner material, for example MICR toner which can be read electromagnetically.

After printing to the front side, the recording medium 120 is turned in a turner 124 and supplied to the remaining print groups 112a-112d for printing to the back side. Optionally, an additional conditioning group (not shown) may be arranged in the region of the turner 124, via which conditioning group the recording medium 120 is prepared for printing to the back side, for example a quick fixing (partial fixing) or other conditioning of the previous printed front side print image (or of the entire front side or also of the entire back side). It is thus prevented that the front side print image is mechanically damaged by the subsequent print groups upon further transport.

In order to achieve a full color printing, at least four colors (and therefore at least four print groups 111, 112) are required, and in fact the primary colors YMCK (yellow, magenta, cyan and black), for example. Additional print groups 111, 112 with special colors (for example customer-specific colors or additional primary colors in order to expand the printable color space) may also be used.

Arranged after the print group 112d is a register 125 via which the register marks (which are printed on the recording medium 120 independently of the print image, in particular outside of the print image) are evaluated. The transversal and longitudinal registration (the primary color dots that form a color dot should be arranged atop one another or spatially very close to one another; this is also designated as color registration or full-color registration) and the register (front side and back side must precisely spatially coincide) can therefore be adjusted so that a qualitatively good print image is achieved.

Arranged after the register 125 is the fixer 130 via which the print image on the recording medium 120 is fixed. Given electrophoretic digital printing, a thermal dryer is preferably used as a fixer 130, which thermal dryer largely evaporates the carrier fluid so that only the toner particles still remain on the recording medium 120. This occurs under the effect of heat. The toner particles may thereby also be fused onto the recording medium 120, insofar as they have a material (resin, for example) that may be fused as the result of a heat effect.

Arranged after the fixer 130 is a drawing plant 126 that draws the recording medium 120 through all print groups 111a-112d and the fixing unit 130 without an additional drive being arranged in this region. A friction drive for the recording medium 120 would create the risk that the as of yet unfixed print image could be smeared.

The drawing plant 126 supplies the recording medium 120 to the take-up device 7 that rolls up the printed recording medium 120.

Centrally arranged in the print groups 111, 112 and the fixer 130 are all suppliers for the digital printing 1, such as climate control 140, power supply 150, control 2 (controller), fluid managers 170 (such as fluid control 171 and reservoirs 172 of the different fluids). In particular pure carrier fluid, highly concentrated liquid developer (higher proportion of toner particles in relation to the carrier fluid) and serum (liquid developer plus charge control substances) are required as fluids in order to supply the digital printer 1, as well as waste containers for the fluids to be disposed of or containers for cleaning fluid.

The digital printer 1, with its structurally identical print groups 111, 112, is of modular design. The print groups 111, 112 do not differ mechanically, but rather only due to the liquid developer (toner color or toner type) that is used therein.

Such a print group 111, 112 is based on the electrophotographic principle, in which a photoelectric image carrier is inked with charged toner particles with the aid of a liquid developer, and the image that is created in such a manner is transferred to the recording medium 120.

The print group 111, 112 is essentially comprised of an electrophotography station, a developer station and a transfer station.

Depending on the model and configuration, such high-capacity digital printers extend over a length of 10 m to 30 m.

Therefore, multiple control panels are to be appropriately provided that simultaneously allow multiple people to read data of the digital printer and look at control panels at multiple locations.

The printing system 1 has internal control systems that comprise a printing system controller 4 and multiple print group controllers 5 (BDB: bar driving board) (FIG. 1). The print group controllers 5 transmit the rastered print data to the corresponding print groups. These rastered print data are for the most part binary print data, wherein each bit represents a print point. If the bit is set, the corresponding print point is printed. If the bit is not set, the corresponding print point is not printed.

The printing system controller 4 controls the main module of the printing system 1, the paper transport and general control tasks with regard to the print groups 3. The printing system controller 4 has interfaces with pre- and post-processing apparatuses, which in particular comprise the take-off 6 and the take-up 7. Additional pre- and post-processing apparatuses may be connected, for example a cutting apparatus, enveloping apparatus or the like.

The control system 2 serves to process print jobs which are transmitted to said control system 2 from a print server 8. Such a print job normally comprises print data and a job ticket. The job ticket includes instructions as to how the print data are to be processed. The control system 2 has multiple computer units that are connected with one another via an internal LAN 9. For example, the LAN may be designed as an Ethernet or Infiniband. The computers comprise a main computer 10, multiple raster computers 11 and multiple interface computers 12.

The main computer 10 receives the print jobs and distributes portions of the print jobs to the raster computers 11 for rastering of the print data. The main computer 10 hereby attempts to utilize the raster computers 11 as uniformly as possible. The raster computers 11 convert the print data into the rastered print data suitable for controlling the print groups 3. The rastered print data are forwarded from the raster computers 11 to the interface computer 12 via the internal LAN 9. The rastered print data are cached at the interface computers 12. Each interface computer 12 is respectively connected with one of the print group controllers 5 and transfers the rastered print data to the corresponding print group controller 5 via the optical waveguide 13.

The printing system controller 4 is connected to an external interface of the internal LAN 9 of the control system 2 and receives control commands from the main computer 10 of the control device 2 for controlling the printing system and the pre- and post-processing apparatuses.

The internal LAN 9 of the control system 2 may have additional external interfaces for the connection of one or more control panel computers 14 and/or one or more service computers 15.

Furthermore, the control system 2 has a router 16 to which a service computer 17 may be connected via a WAN.

A printer control panel computer 18 is directly connected with the main computer 10 of the control device 2 via an SPO-LAN (Service Panel Operator-LAN). The printer control panel computer 18 serves to monitor and control the print data. This printer control panel computer 18 is typically used by an operator who controls the workflow of the different printing processes at the printing system. Conversely, the control panel computer 14 or service computer 15 are used by operators or service technicians who are responsible for the continuous operation of the printing system.

The printing system may have multiple control panel computers 14 and/or multiple service computers 15, and also may be connected with multiple printer control panel computers 18.

The service computers 15, 17 differ from the control panel computers 14 in their access rights, wherein the service computers 15, 17 may make more adjustments to printing systems than the control panel computer 14, as is explained further below. For example, an installation of software components may also be performed at service computers or at a printing system, which is not possible at control panel computers 14.

The control system 2 has a remote servicing module (PCI: Power Control Interface) 19. With this remote servicing module 19, the control system 2 may be started up or shut down via remote control. Moreover, this remote servicing module 19 supplies additional functions for remote control of the control system 2.

Given this printing system, multiple control panels are provided at the computers 14, 15, 17, 18.

Figure 2:
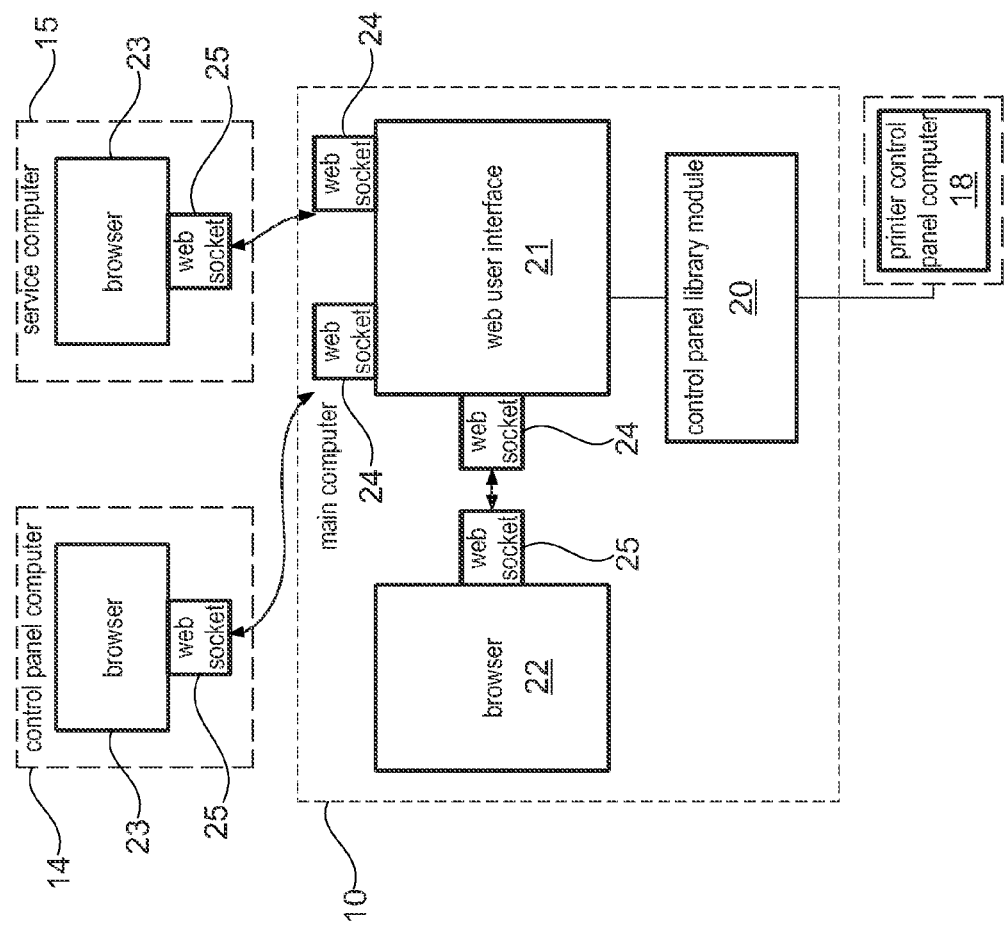
FIG. 2 illustrates schematically in a block diagram, a main computer of a control system and client computers connected with the main computer.

At the main computer 10 of the control system 2, a control panel library module 20 is provided which comprises multiple control panel modules with which a control panel for the printing system may be presented on the computer display (FIG. 2). The control panel modules also allow a control of the printing system 1 via the control panel presented on the computer display.

The printer control panel computer 18 is connected with the control panel library module 20 via the SPO-LAN. Provided at the printer control panel computer 18 is a client program with which the control panel is presented and the corresponding control functions are executed.

The control panel library module 20 is connected with a web user interface 21 that is a web server with which the control panel modules of the control panel library module 20 are made available in a browser. In the present exemplary embodiment, the web user interface 21 has been realized via an Apache Tomcat server. In principle, other web servers are also suitable here.

This web user interface 21 may communicate directly with a browser 22 provided on the same computer, wherein the communication is implemented via web sockets 24, 25. For communication with "external" browsers 23 which are provided on additional computers 14, 15, the web user interface 21 is coupled with an additional respective web socket 24. The web socket 24, 25 is a software module that forms an interface which may establish a continuous logical Internet connection with a browser that is connected via a data connection with the computer at which the web socket 24, 25 is arranged. The data connection is hereby a data network, for example.

The browser 22 on the main computer 10 and the browsers 23 on the computers 14, 15 may thus be continuously supplied with information from the web user interface 21 or may transmit information and in particular messages to the web user interface 21. For this, the browsers 22, 23 respectively have a corresponding web socket 25.

The individual software modules that are provided on the different computers are explained in detail in the following.

In addition to the already explained control panel library module 20, the web user interface 21 and the browser 22, an operating system 26, a function code 27, an infrastructure manager 28 for interfaces to the hardware, a web user interface database 29, web user interface plugins 30 and a trace module 31 are provided at the main computer 10 (FIG. 3).

The trace module 31 serves to record error protocols of all software components executed in the printing system 1 and/or in the control system 2 and/or of "external" software components that are executed on other computers 8, 14, 15, 16, 17, 18.

The function code 27 is designed for the execution primarily of printing-relevant software routines, for example a load distribution of the print data from the main computer 10 to the raster computers 11, raster calculations at the raster computers 11 for a rastering of the print data, and controlling a caching of the rastered print data at the interface computers 12. With the function code 27, the arriving print jobs are processed so that they may be printed out at the printing system 1.

The web user interface database 29 includes all persistent data for the operation of the web user interface 21, for example long-term data, data for user configuration, settings, initialization data (for sensors, for example), data for monitoring structures (which are explained further below), as well as additional data that are necessary for the operation of the web user interface 21.

The web user interface plugins 30 serve for communication with the local computer or additional external computers at which corresponding web user interface plugs are provided. Predefined tasks or applications are stored in a web user interface plugin 30.

The control panel library module 20 comprises a plurality of control panel modules that are explained in detail in the following (FIG. 4):

A DE agent (device agent) 32 creates a data connection for the communication between the control panel and the printing system, and represents the link between the control panel and the printing system. Furthermore, the DE agent 32 provides a standardized interface in order to make the printer status available.

An RMI server (Remote Method Invocation server) 33 has functions that may be called by an external computer and that are executed on the computer at which the RMI server is executed, for example for the further processing of events. Furthermore, it provides functions that facilitate or enable such a remote access. For example, such functions are the assignment of access tickets, as is explained in detail below.

An ORS agent (OCÈ Remote Service agent) 34 collects hardware data and data of software events and transfers these data from the main computer 10 to a computer (not shown) of a service center via a WAN (Wide Area Network).

A trace agent 35 enables the recording or logging of trace data of other modules and the preparation of these data.

A web server 36 enables the downloading of program libraries (for example of Java program libraries) from the main computer 10 to the computer 14 in order to be able to present and control the control panel at this computer 14. Furthermore, the web server 36 provides a web start function (for example a Java web start function) in order to initialize the control panel at the computer 14. In the present exemplary embodiment, the web server 36 is realized by an Apache Tomcat server. In principle, any other web server, any other program library and/or any other web start function is suitable for this.

A system parameter manager 37 (SPManager) serves for data distribution between the modules.

An SEA agent (service event log agent) 38 implements a protocol or a log file of the events that have occurred.

An OP master 39 provides a network interface, for example an SNMP gateway for the transfer of parameters to and from the printing system 1.

A UIC agent (User Interface Controller agent) 40 enables the control of predetermined workflows or the adjustment of defined states of printing systems connected with the main computer 10. For example, the startup of the printing system 1 may be executed automatically with this.

A TR file collector 41 is an agent that—as a supplement to the trace agent 35—collects and prepares trace data from programs executed on the main computer, which programs have been provided by third-party vendors.

An Ops-PAC (Ops Privileged Access Service) 42 serves to assign privileged rights (administrator rights) to other agents or applications for the implementation of specific functions. These privileged rights are predominantly necessary in order to execute the agents or applications with the desired effect.

An RDP agent (Remote Diagnosis Process agent) 43 provides an internal service interface.

An error agent 44 serves to remedy, collect, distribute, present and reset errors.

A CDC agent 45 serves for the normalized relaying of printing parameters to other agents or modules to other control systems 2 of other printing systems 1. These printing parameters are, for example, paper width, color etc.

The web user interface 21 comprises a plurality of web user interface modules that are explained in detail in the following (FIG. 5):

A web server module 46 (for example an Apache Tomcat) provides the web server functions (already explained above) of the web user interface 21. The web server module 46 and the web server 36 explained above may also be combined into one web server that is executable or executed on the main computer 10.

In the web server 46 is a framework 47 that provides rules, methods, functions, classes and/or structures for the control of the web server module 46, in particular with regard to data objects with which a control panel is described. In the present exemplary embodiment, the framework 47 is a Grails framework. In principle, other frameworks are also suitable here.

The programming of the control of the web server module 46 or of the web user interface 21 takes place with the aid of a program code 48. Program routines that are part of the program code 48 are further transmitted as needed to the browsers 22, 23 for execution, wherein the browsers 22, 23 are controlled (preferably in a control panel file, as is explained further below) via these transmitted program routines. The program code 48 is created in one or more (scripting) programming languages. In the present exemplary embodiment, the (scripting) programming languages that are used are Java and Groovy. In principle, other programming languages or scripting programming languages are suitable here. The program code 48 includes printer-specific programs, program routines, methods, functions, classes, structures and/or extensions.

External plugins 49 and external libraries 50 are used in order to provide additional functions for the programming and/or control of the web user interface 21.

Web server services 51 are made available by the web user interface 21 to external communication partners, wherein external communication partners are apparatuses, installations, devices or software modules that are located outside of the web user interface and communicate with said web user interface 21. The web server services 51 are initiated by the external communication partners and execute functions within the web user interface 21.

Data are processed with the aid of views 52 for presentation at the user interface of the control panel.

Controllers 53 take over control functions within the web user interface 21, prepare the data to be presented in terms of their content, provide functions and data, wherein in particular data to be displayed at the request of the browsers 22, 23 are provided to the views 52.

The web server services 51 include a plurality of service components that are explained in the following (FIG. 6).

An IsMa service (infrastructure manager service) 54 serves to be able to call plugins and communicate with other IsMa services 28 at "external" systems, for example at other computers 11, 12.

Menu structures are generated and administered via a menu service 55. Menus may be dynamically reloaded at "external" systems, for example.

A push helper service 56 enables a load distribution and monitored, chronologically staggered transfer of data to "external" systems.

An RMI service 57 enables the communication between the web user interface 21 and the RMI server 33 of the control panel library module 20.

A scheduler service 58 reacts to software events and fulfills chronologically pre-planned tasks, for example a purging of a database.

The browsers 22, 23 include various browser components that are explained in the following (FIG. 7).

A (scripting) programming language module 29 serves to control the browsers 22, 23 and to control their communication with the web user interface 21. The (scripting) programming language module 59 is an interpreter or a compiler for a scripting programming language or a programming language. In the present exemplary embodiment, JavaScript is used as a scripting programming language. In principle, other (scripting) programming languages are also suitable here.

A markup language module 60 enables the interpretation and presentation of the markup language files transmitted to the browsers 22, 23, wherein the markup language serves for the structuring of digital contents (such as texts, images and hyperlinks) in electronic documents, as has already been explained above. In the present exemplary embodiment, the markup language is realized according to the "HTML5" (Hypertext Markup Language) standard, which is presently developed by the World Wide Web Consortium. In principle, other markup languages are also suitable here.

A document access interface 61 is an interface that enables access to structured electronic documents such as the markup language files transmitted to the browsers 22, 23. Their data structure may hereby be presented in the form of a tree structure. In the present exemplary embodiment, a document access interface according to the "DOM Level 3" (Document Object Model) standard is used, which standard has been defined by the World Wide Web Consortium. In principle, other document access interfaces are also suitable here.

A design style language module 62 provides a text-based design language for the formatting or declarative programming language for style templates of the structured electronic documents. The presentation of the markup language files transmitted to the browsers 22, 23 is formatted with the aid of the design language module 62. In the present exemplary embodiment, the design language is realized according to the "CSS3" (Cascading Style Sheets) standard, which has been defined by the World Wide Web Consortium. In principle, other design languages are also suitable for here.

A raster computer 11 comprises various software components (FIG. 8). In the present exemplary embodiment, these software components are an operating system 26, the function code 27, the infrastructure manager 28 and web user interface plugins 30, which have already been explained above.

An interface computer 12 comprises various software components (FIG. 9). In the present exemplary embodiment, these software components are an operating system 26, the function code 27, the infrastructure manager 28 and web user interface plugins 30, which have already been explained above. In addition to these software components, another print group control driver 63 is present that enables the interface computer 12 to transmit print data to the print group controller 5.

The printing system controller 4 includes various software components (FIG. 10) that are explained in the following.

A main module 64 serves to control and monitor additional software components of the printing system controller 4.

A paper transport module 65 controls the paper transport of the printing system 1 in that it controls the take-off 6, the take-up 7 and additional drive rollers (not shown) in the printing system 1.

Via sensors (not shown), a printer module 66 detects various parameters of the print group 4 (for example temperature, humidity, presence of paper etc.) that directly or indirectly affect the printing capability and/or the print quality. From the detected sensor data, the printer module 66 determines a printer status in that it evaluates the detected parameters. This evaluation occurs via a check as to whether the respective parameter values are within predetermined value ranges that define a regular operation of the print group 4. The printer status is transmitted to the main computer 10.

As software components, the remote servicing module 19 includes an operating system 26 and an SNMP (Simple Network Management Protocol) service 67 (FIG. 11). The SNMP service 67 serves for simple network communication of the remote servicing module 19 with other devices of the control system 2.

As software modules, the control panel computer 14 includes an operating system 26, a browser 23 and a control panel user interface 68 (FIG. 12). The control panel user interface 68 enables control panels for the operation of the printing system 1 and/or of the control system 2 to be displayed at the control panel computer 14, and enables adjustments to be made in these control panels. The control panel user interface 68 is initialized, presented and controlled with the aid of the Java program libraries and the Java Web Start function (downloaded from the web server 36 onto the control panel computer 14), as has already been explained above.

The service computer 15, 17 includes as software components an operating system 26, a browser 23 and a service module (CoDi: Configuration and Diagnostics) 69 (FIG. 13). With the aid of the service module 69, the configuration of the printing system 1 and/or of the control system 2 may be changed and information regarding the software diagnosis and/or hardware diagnosis may be received from the printing system 1 or the control system 2.

The present exemplary embodiment (FIG. 1) has various computers 14, 15, 17, 18, 19 via which adjustment tasks may be conducted at the printing system 1 and/or the control system 2 by means of a respective control panel, and via which the printing system 1 and/or the control system 2 may be monitored. In particular, for these purposes a plurality of control panel computers 14 and/or service computers 15, 17 may be connected to the control system 2.

The main computer 10 is designed to generate the control panels for the connected computers 14, 15, 17, 18, 19 with the aid of the control panel library module 20 executed on said main computer 10. Each of the control panels is defined by a set of parameters and commands that may be transmitted to the computers 18, 19 and be realized there in a control panel via a special client program. For the computers 14, 15, 17, this set of parameters and commands that define the control panel of the respective computer 14, 15, 17 is received (together with additional information that is explained further below) from the web user interface 21 as a control panel structure and converted into the control panel file. The conversion into the control panel file thereby takes place according to a predetermined markup language. In the present exemplary embodiment, HTML5 is used as a markup language and the control panel file is accessed with the aid of the document access interface 61. Furthermore, in the present exemplary embodiment the control panel file includes program code 48 that is created in JavaScript and is formatted with the aid of the design language module 62 according to its rules. The control panel file is then transferred to the respective computers 14, 15, 17 via the existing data connections.

Each of the browsers 22, 23 can interpret the control panel file. The control panel is hereby displayed at the user interface (GUI: graphical user interface). Each control panel has at least one display object. Such a display object that serves for the display of a defined parameter, value or section of the user interface is a part of the control panel and is a self-contained element of said control panel. The display objects of a control panel are independent of one another and thus may be transferred or updated independently of one another. Typical display objects are GUI elements that correspond to a display object type, for example a list field, a button, a check box, a progress bar, a value field etc. A display object may have properties and/or present a value of a data source, for example a temperature, a switch position, a text, a graphic, a list etc. The properties include basic properties of the display object, for example whether the display object may only be read out (read-only) or may be written to (writeable), and value-specific properties such as limit values, thresholds etc.

One example of a display object of a display object type and its properties, as well as an associated data source, is a check box that cannot be controlled by the user, which check box has the properties "marked" and "not marked" and is linked with a switch as a data source. If the switch is open, the check box is not marked; if the switch is closed, the check box is marked or checked. The switching between the two states of the check box takes place via its properties (marked or not marked). An additional example is a temperature display in the form of a text field in which the value of a temperature is indicated as a number. A temperature threshold for the temperature is stored in the properties of the text field. If the temperature value is below the temperature threshold, the number is indicated in black type, which is established in the style template of the design language module 62. If the temperature value exceeds this predetermined temperature threshold, according to the style template of the design language module 62 a red type is set for the text field so that the number in the text field is displayed in red type and the overrun of the temperature threshold is signaled.

A data source (not shown) is a device or installation that is designed to detect or transmit data, for example a sensor (temperature sensor, rotation speed sensor, optical sensor etc.), a switch contact, a database etc. of the printing system 1 or of the control system 2. A data source transmits precisely one value (for example 3 degrees Celsius) with regard to a parameter (temperature, for example) at a point in time. A data source may be linked with a display object or be associated with this, meaning that the display object is designed to present the value of the data source.

Each browser 23 is executed on one of the computers 14, 15, 17 in a session. In principle, what is designated by a session is a standing connection of a client computer with a server computer, wherein here the term "session" is used to the effect that a markup language file defining the control panel is executed in a browser 23 on the client computer 14, 15, 17.

The browser 22 is also executed in a session at the main computer 10, wherein here the term "session" is also used to the effect that a markup language file defining the control panel is executed in a browser 22 on the main computer 10.

Upon an initial connection request of one of the computers 14, 15, 17 to the main computer 10, a unique session ID is associated with the respective session via the external plugins 49. This session ID is stored in a corresponding session table at the web user interface 21 and is transmitted from the main computer 10 to the computers 14, 15, 17. The communication between the web user interface 21 of the main computer 10 and the browsers 23 of the computers 14, 15, 17 is controlled with the session ID. Linked together with the session ID, a web socket ID of the respective web socket 24 is stored in the session table on the main computer 10 so that the web user interface 21 may determine with which session it may communicate via which web socket 24.

Browsers may have a presentation with multiple windows or index cards (tabs) within the browser. Since the web user interface 21 in principle only knows one session ID, upon an initial call of the control panel in a window or in a tab of a browser 23 the generation of a window ID (tab ID) is initiated in the web user interface 21 via the program code 48 in the browser—which program code 48 is transmitted upon being called—and said window ID is stored in a reference table FIG. 14) on the main computer 10, which is explained in detail below. The web user interface 21 may uniquely identify each window of each browser 23 via the window ID. The web user interface 21 transmits the window ID to the respective computer 14, 15, 17 so that this may be non-transiently associated with the respective window there via storage. The unique association of a window ID with one of the browsers 23 is explained further below.

Every display object has a unique display object ID with which the display objects are to be uniquely identified. The display object ID is generated by the control panel library module 20 upon initialization of the respective display object for the display (meaning upon generation of a control panel) and stored in the reference table on the main computer 10. The reference table thus includes all display objects that are currently presented in all browsers 23.

The display object ID is passed via the existing data connection to the presenting browser 23 in the control panel file which defines the control panel, such that the browser 23 may likewise store the display object ID in a local data structure on the computer 14, 15, 17 and associate said display object ID with the respective display object.

Each data source has a data source ID via which the respective data source is to be uniquely identified. The data source ID is stored in the configuration of the main computer 10 upon installation of the respective data source. However, it may also be generated dynamically upon initialization of the printing system 1 and/or of the control system 2 in that the connected data sources are determined and a data source ID is automatically associated with these.

The bandwidth requirement of the corresponding data connections and the reaction times increase with the multitude of computer 14, 15, 17. A reduction of the data transferred to the computers 14, 15, 17—which data represent the display objects, display object properties and values displayed in the browser 23—as well as a distribution of the available connection capacity among the individual computers 14, 15, 17 is therefore desirable.

In order to reduce the data quantity to be transferred, a display object that displays a value is linked with the data source from which the value to be displayed results such that, given a change of a value presented in a display object, it is possible to transfer only the changed value instead of the entire display object with the contained values.

For this, the reference table is stored and updated on the main computer 10, which reference table establishes the relation between: a display object that displays a value of a data source; a session in a browser window; and the data source from which the value originates. Via the reference table, the web user interface 21 is informed at all times about the current display objects presented in each of the browsers 23, in particular about the display objects that indicate values of data sources.

The reference table includes as entries the display object ID, the session ID, the window ID, the user ID and the data source ID. The information about a presented display object, with the session ID and the window ID of the browser 23 presenting the display object, is herein linked with the user ID of the user operating the browser 23. A data source linked with the display object is additionally specified in the event that the display object is linked with such a data source.

The reference table according to FIG. 14 is an exemplary embodiment of a data structure which describes the relationship between the individual entries. The data structure may also be of different design. In particular, instead of one table multiple sub-tables may be provided that are related to one another.

In principle, data within the printing system 1 or the control system 2 are stored as data objects. These data objects may have relationships to one another. Such relationships between data objects are stored as relations. For a clear explanation, tables are used in the following instead of describing such abstract relations.

If a change occurs to a value of a data source, a value change event is generated by the respective data source with the changed value and the data source ID, which value change event is sent to the main computer 10. The main computer 10 receives the value change event in the DE agent 32, which relays this to the RMI server 33. The RMI server 33 relays the value change event to the web server services 51 of the web user interface 21. The web server services 51 then determine from the reference table all data object IDs that are linked with the data source ID, and the associated session IDs and window IDs. The web user interface 21 subsequently sends the respective window ID(s) and the respective data object ID(s) with the changed value only to the browsers 23 of the determined sessions. Every addressed browser 23 then presents the changed value in the corresponding data object in the corresponding window. The value may hereby be a number, a text, a property of the data object, a graphic etc.

A GUI change event is always triggered when a user interaction has occurred in the browser 23 that implements a change to the user interface (graphical user interface, shortened to GUI), for example a menu call, a web site call, a change of the focus etc. The GUI change event is sent from the browser 23 to the web user interface 21 and includes the session ID, the window ID, the type of action implemented in the browser 23, the data object ID of the data object connected with the change, and additional information that pertains to the data object (for example properties of the data object etc.)

If the web user interface 21 receives a GUI change event, it passes this to the control panel library module 20. The control panel library module 20 determines from the GUI change event the data objects to be transferred to the respective computers 14, 15, 17, their data object IDs, their data object type, their properties as well as the data sources linked with them, in order to update or change the presentation of the user interface. The control panel library module 20 transfers this information—together with the session ID, the window ID and with additional parameters and commands—as a control panel structure to the web user interface 21, which generates the control panel file from this as explained above. The web user interface 21 checks the transferred data objects and updates the reference table. The web user interface 21 hereby removes data objects that are no longer presented in the window of the browser 23 from the reference table, in that it deletes all entries of data objects that are associated with the session ID and window ID, and then adds to the reference table the new data objects that are to be presented in the window of the browser 23.

The web user interface 21 then transfers the generated control panel file to the window of the corresponding session in which the GUI change has occurred, and the receiving browser 23 presents the display objects with properties and values. For example, given a menu call the main computer 10 transmits the menu with its menu entries and their property settings to the corresponding browser 23.

If a control action is taken (meaning that a value is changed or an adjustment is made that affects the printing system 1 or the control system 2) in a data object of a browser 23, then a control message is transmitted to the web user interface 21 so that this may react accordingly.

The window ID in the reference table may also be omitted if the browser 23 is not designed to present multiple windows with different control panels, or if said browsers 23 are not executed in multiple instances at the computers 14, 15, 17 and do not display different control panels. The web user interface 21 then transfers changed values only to the individual control panel of a respective session.

The reference table on the main computer 10 may optionally include additional information as to which window of every browser 23 is active or has focus, i.e. is displayed in the foreground and is operable. For this, the main computer 10 is informed by the client computers 14, 15, 17 about which window is active. For example, this may occur in that, with a control action or a GUI change event, a window ID is transmitted at which the GUI change or the control action has taken place, or if the user changes the focus to a window of the respective browser 23 in that he brings the window into the foreground. Given a value change event, the web user interface 21 then also takes into account the focus information from the reference table in the determination of the sessions, windows and data objects to which values are transferred. Changed values are transferred only to data objects linked with the respective data source that are presented in active windows. The data to be transferred are thereby further reduced.

In order to effectively use the connection capacity between the main computer 10 and the additional computers 14, 15, 17 that are connected with said main computer 10, combined data are transferred to the individual computers 14, 15, 17 at predetermined points in time.

The transfer of the data at the predetermined points in time is realized via a wait period after a transfer, meaning that a wait period occurs after every data transfer to a browser 23 of a session. Only after the expiration of the wait period may data be transferred to the same browser 23 again. If a value changes multiple times during the wait period, this value is thus not transferred multiple times to the browser 23, but rather only once after expiration of the wait period. This reduces the data to be transferred. Via the wait period it is also ensured that transfers to other browsers 23 may be implemented during the wait period. The wait period is generated with the aid of a timer.

Figure 15:
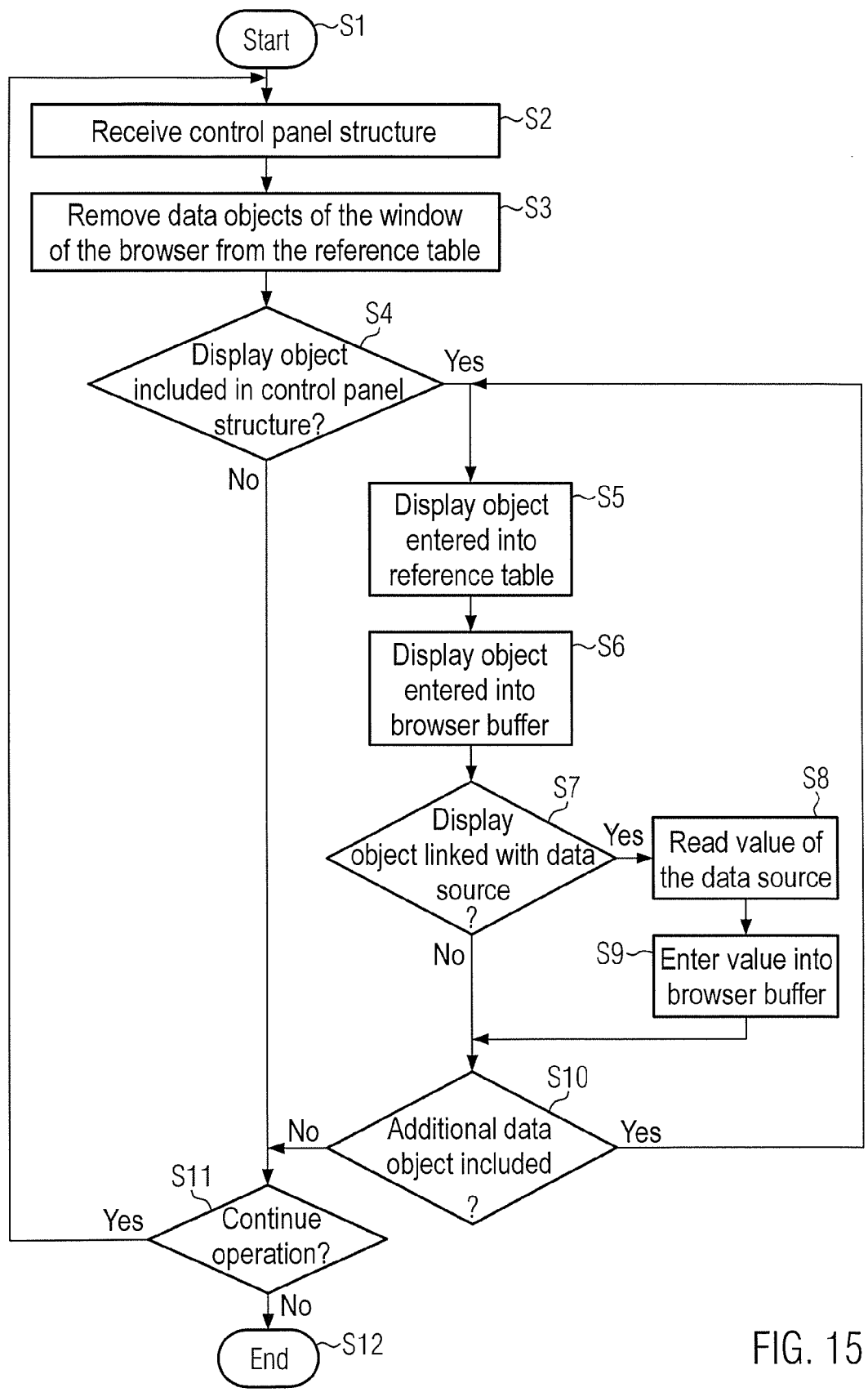
FIG. 15 illustrates a method to update a reference table in a flow chart.

In the following, a method for updating a reference table that may be executed in the web user interface 21 on the main computer 10 is explained (FIG. 15). Display objects (insofar as these are contained in the control panel structure) are additionally stored via the method in a browser buffer for the transfer to the browser 23. If the data object is linked with a data source, the value of the data source is then read and entered into the browser buffer.

The method begins in step S1. In step S2, the control panel structure that is newly generated by the control panel library module 20—with the aid of which control panel structure a new control panel is presented in one of the browsers 23—is received by the web user interface 21. The control panel structure includes information that is suitable for the presentation of the control panel in the user interface, such as the data object IDs of the data objects to be presented, the session ID of the browser 23, the window ID of the browser 23 and additional information that pertains to the respective data objects, for example the properties of the data object, the data object type, and the data source ID of the data source linked with the respective data object.

In the following step S3, all data objects of the window of the browser 23 for which the new control panel structure has been generated, which data objects are entered into the reference table, are removed from said reference table. This means that the display objects that were previously presented in the window of the browser 23 are deleted in the reference table.

Following after this is the execution of step S4, in which a check is made as to whether a data object ID of a data object is included in the received control panel structure.

If it is established in step S4 that a data object is included, step S5 is then executed, in which the first data object included in the control panel structure is entered as a new data object into the reference table together with the session ID and the window ID and—if present—the data source ID that logically links the data object with a data source. If a data object is not linked with a data source, then a value that signals "no linked data source" (for example a "0") is entered into the field for the data source.

The execution of step S6 then follows, in which the data object is entered into the browser buffer associated with the window of the browser 23. The browser buffer serves to buffer the data that should be passed to the respective browser 23, for example display object data, values etc., and is associated with precisely one browser 23 with the aid of the session ID and window ID.

Step S7 is subsequently executed, in which a check is made as to whether the data object is linked with a data source.

If it is established in step S7 that the data object is linked with a data source, then step S8 is executed, in which the value of the data source that is linked with the data object is read from said data source and entered into the browser buffer in the following step S9. This has the effect that the data object displays a value upon the first appearance in the user interface.

The execution of step S10 then follows, in which a check is made as to whether an additional data object is included in the received control panel structure.

If it is established in step S10 that an additional data object is included, the method web returns to step S5, in which the additional data object is entered into the reference table.

If it is established in step S10 that no additional corresponding data object is included, the execution of step S11 then follows, in which a check is made as to whether the operation is to be continued. If the operation is not to be continued, then step S12 follows, in which the method ends. However, if the operation is to be continued, the method workflow transitions to step S2 after the execution of step S11.

If it is established in step S4 that no data object was received in the control panel structure, the method workflow transitions directly to step S11.

If it is established in step S7 that the data object is not linked with a data source, the method workflow then transitions directly to step S10.

Alternatively, the method explained above may be expanded to update the reference table in that the web user interface 21 also takes into account the focus information (which is transferred with a GUI change event) of a window of the respective browser 23, in that the web user interface 21 updates this focus information in the reference table. For example, this may occur in that the web user interface enters "true" in the focus information for newly entered data objects of a window or of a session of the browser 23, and enters "false" in the focus information in the reference table for all other data objects, meaning all data objects of all other windows of the browser 23.

By updating the focus information in the reference table, the requirement is met that only the values are transferred of the data objects that are presented in a window that has focus or is located in the foreground, and the transfer of values of data objects that are presented in a window that does not have focus or is located in the background does not occur, as is explained further below. The transferred data quantity is thereby further reduced.

With the method to update a reference table that in particular establishes a relationship of a data object presented in a browser 23 and a data source, the requirement is met in order to be able to be reduce the data to be transferred upon a value change of a data source via selective transfer of the changed value to the presenting data object of the respective browser 23.

Figure 16:
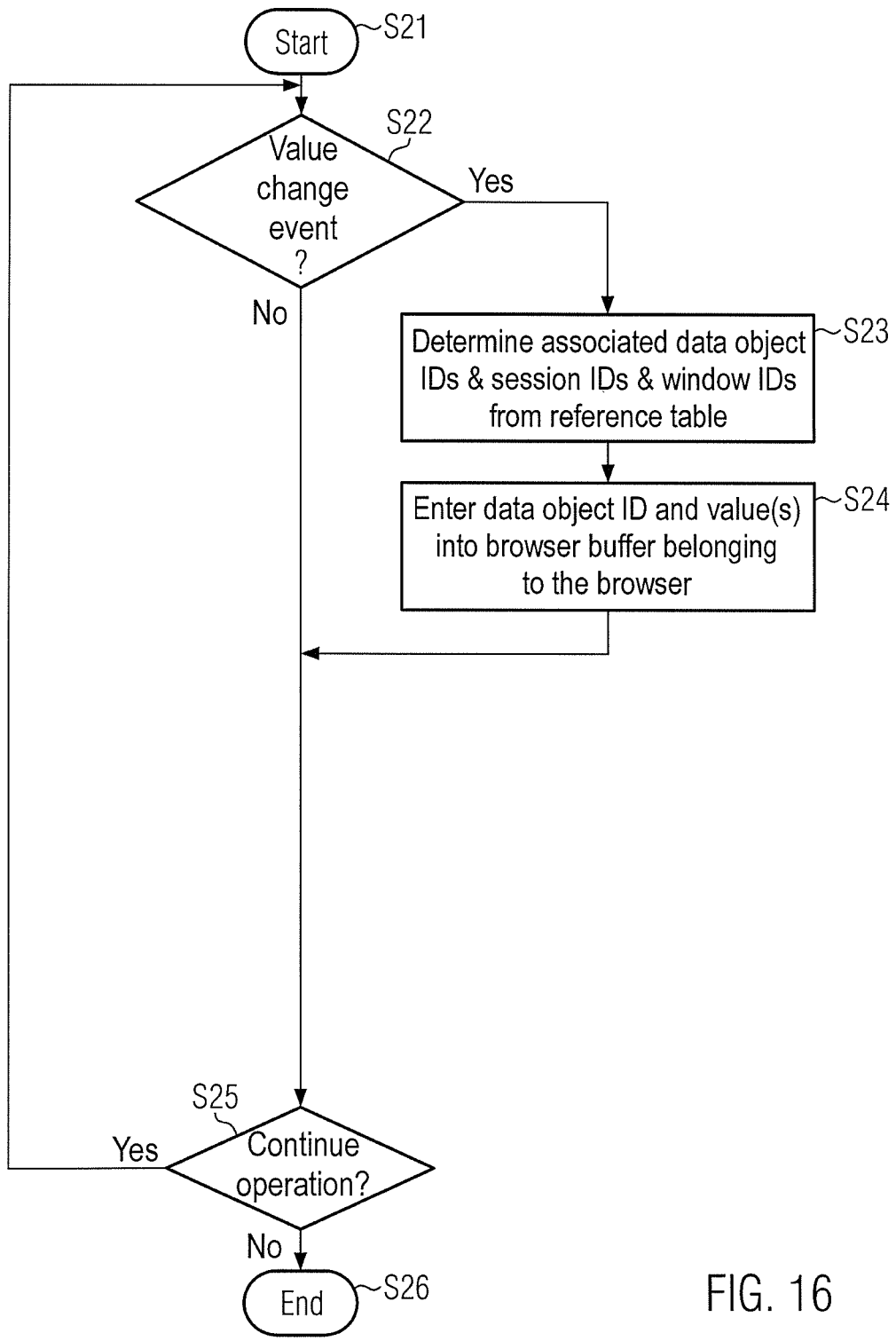
FIG. 16 illustrates a method to prepare a selective transfer of a changed value in a flow chart.

A method for preparation of a selective transfer of a changed value to only the browsers 23 which—according to the reference table—currently present the value in a data object, which method is executable in the web user interface 21 on the main computer 10, is explained in the following (FIG. 16).

The method assumes that a reference table is stored and updated on the main computer 10, as is explained above.

The method begins in step S21. In step S22 it is then established whether a value change event has occurred. The value change event is always triggered when the value of a data source has changed. The value change event is transmitted from the data source to the main computer 10 and includes a data source ID and the value of the data source referenced with the data source ID.

If a value change event has occurred, step S23 is executed, in which all data object IDs of the data objects that display the value of the data source, and the associated session IDs as well as associated window IDs of the browser 23 that present the data objects referenced by means of the data object IDs, are determined from the reference table using the data source ID.

Step S24 is subsequently executed, in which the determined data object IDs and the value included in the value change event are entered into all browser buffers that are respectively associated (via the session ID and window ID) with a browser 23 presenting the data object. A newer value of a data source hereby overwrites an older value of the same data source that is still present in the browser buffer. It is hereby ensured that, for a specific data object of a browser window, only the most current value that is to be presented is stored in the browser buffer.

The execution of step S25 then follows, in which a check is made as to whether the operation is to be continued. If the operation is not continued, step S26 then follows, in which the method ends. However, if the operation is to be continued, after the execution of step S25 the method workflow transitions to step S22.

Alternatively, the method explained above may be expanded to the preparation of a selective transfer of a changed value in that, given a value change of a data source of the web user interface 21, the focus information (previously stored in the reference table) of the window is considered as well, and only the values of the data objects that are presented in a window that has the focus or is located in the foreground are entered into the respective browser buffer, and the values of the data objects that are presented in a window that does not have focus or is located in the background are not entered. The transferred data quantity is thereby further reduced.

The data to be transferred from the main computer 10 to the corresponding browsers 23 are reduced with the method for preparation of a selective transfer of a changed value only to the browsers 23 that—according to the reference table—currently present the value in a data object.

Figure 17:
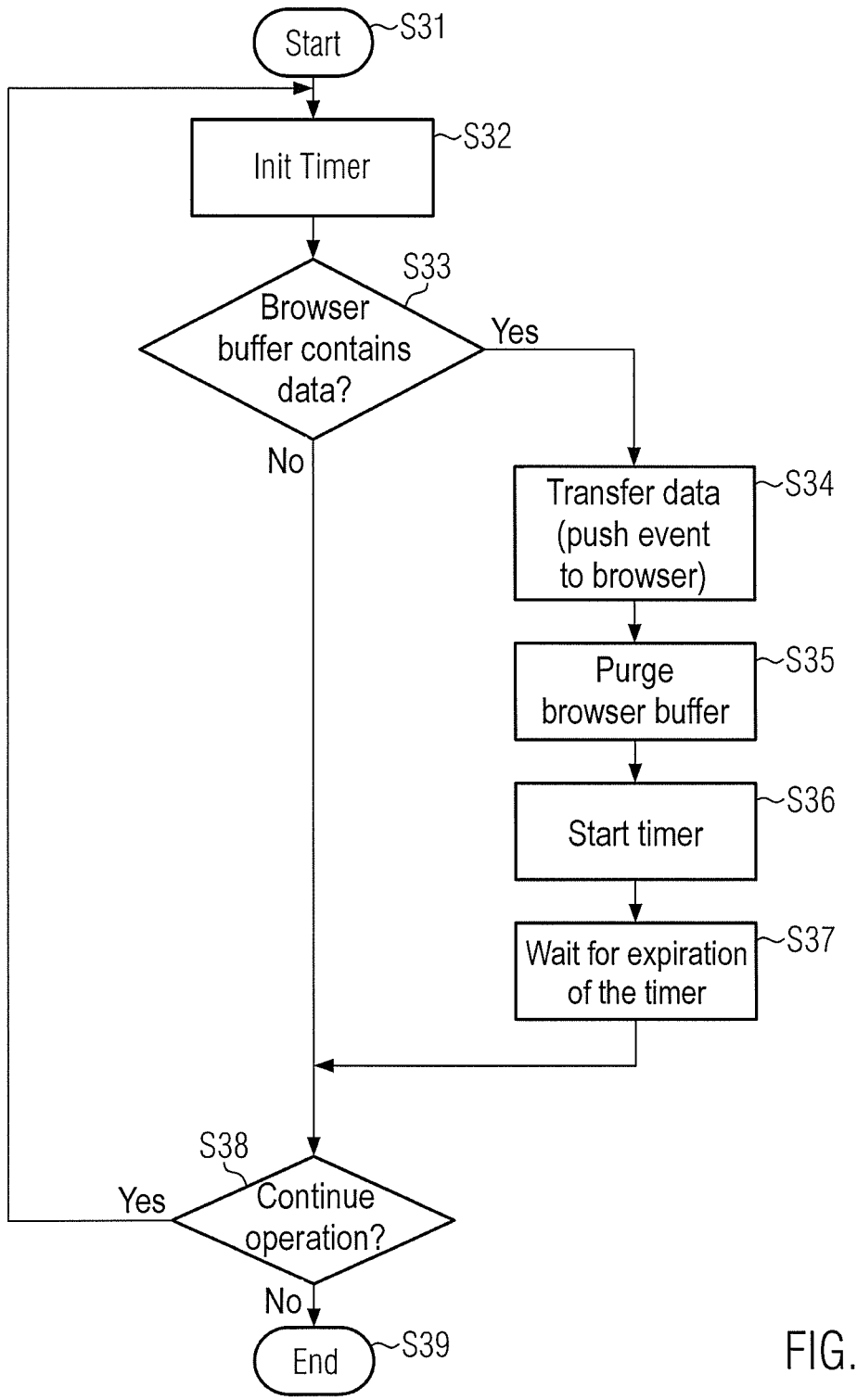
FIG. 17 illustrates a method for combined transfer of data at predetermined points in time in a flow chart.

A method for assembling data that are to be transferred from the web user interface 21 of the main computer 10 to a window of one of the browsers 23, wherein the transfer is implemented only at predetermined points in time, is explained in the following (FIG. 17). The method is executed on the main computer 10 for each window of one of the browsers 23 that displays a control panel at a computer 14, 15, 17.

The method assumes that—as in the method explained above and shown in FIG. 16—changed values are entered into the browser buffers that are associated with the respective windows of the browser 23. Values of specific parameters hereby overwrite older values of the same parameter that are present in the respective browser buffer. It is hereby ensured that only the most current value in the browser buffer is stored for a specific parameter.

The method begins in step S31. In step S32, a timer is initialized that is associated with the browser buffer via the session ID and window ID. With the initialization, the timer is set to a value that corresponds to a time interval which is to be waited after the transfer of data before new data may be transferred. For example, the timer is loaded with a value that corresponds to 200 ms.

In step S33 a check is made as to whether the browser buffer that is associated (via the session ID and window ID) with the respective browser window of the browser 23 includes data to be transferred.

If this is the case, the execution of step S34 then takes place, in which the data are transferred from the browser buffer to the window of the browser 23 associated with the browser buffer. The data transfer thereby occurs such that the browser buffer is blocked from other accesses; the main computer 10 sends a push event to the corresponding browser 23 via the web sockets 24, 25; and the browser 23 reads out the data from the browser buffer via the web sockets 24, 25 and presents the changed data objects, data and/or values in its window associated with the browser buffer. The push event serves to indicate to the browser 23 that data for the associated browser window are to be read out from the browser buffer.

After the termination of the transfer, step S35 is executed, in which the browser buffer is flushed and—when it is empty—is released again for other accesses in that the block that took place earlier is lifted. Alternatively, the browser buffer may also be purged automatically via the readout.

The timer is subsequently released and proceeds to run (step S36).

In the following step S37, a wait for a timer interrupt takes place, which timer interrupt is triggered by the timer after the expiration of the time interval (of 200 ms, for example). The waiting in step S37 is executed such that other processes may be executed in parallel on the main computer 10. In particular, other processes may access the associated browser buffer while the timer is running.

If the timer interrupt has occurred, step S38 is then executed in which a check is made as to whether the operation is to be continued. If the operation is not continued, then step S39 follows, in which the method ends. However, if the operation is to be continued, the method workflow transitions to step S32 after execution of step S38.

If it is established in step S33 that the browser buffer includes no data, the method workflow is continued directly with the execution of step S38.

The time interval which is to be waited after the transfer of data before new data may be transferred is set to 200 ms in the above example. This time interval is typically in the range from 10 ms to 20 s, and in particular from 10 ms to 1 s. It may preferably be set to be of different length for different browser buffers, and therefore for different data sources. For example, there are parameters that change more slowly as a matter of principle (for example temperature values), given which a sampling in time intervals of 10 ms makes no sense. For example, here time intervals of a few seconds is sufficient, in particular of up to 10 s. In contrast to this, other parameters should be sampled in shorter time intervals and accordingly be transferred more often. The length of the time intervals is therefore preferably determined using the data sources associated with the respective browser, wherein given multiple data sources the data source that requires the shortest time interval is decisive for the determination of the time interval for the respective browser buffer. Alternatively, the length of the time intervals may also be determined by the available connection capacity of the connection between the main computer 10 and the computers 14, 15, 17. If less connection capacity is available, the time intervals are then set to be longer, such that data are transferred less often. In contrast to this, if more connection capacity is available, the time intervals may then be set to be shorter.

Furthermore, the length of the time intervals may also be determined using the data quantity to be transferred. If more data are to be transferred, shorter time intervals are set for the transfer. In contrast to this, if less data is to be transferred, longer time intervals may be set.

The criteria according to which the length of the time intervals are set may be used individually (as described above) or in a combination of multiple of these criteria with one another.

In the described method, the time period is dimensioned to the transfer time of the data from the browser buffer—which data has a variable value depending on the quantity of transfer data—added to the run time of the timer upon whose end an interrupt is triggered, whereby the data transfer starts again.

As an alternative to this procedure, a timer may also be used as a timing circuit that triggers an interrupt after a predetermined time, whereby the data transfer starts, meaning that the time period is dimensioned only to the run time of the timer. It is hereby to be taken into account that the timer interval is chosen to be sufficiently large so that all data are transferred from the browser buffer.

As an additional alternative, a scheduler may be used that enables priorities of the different values of the parameters that are to be transferred and/or priorities of the different executed browsers 23 (using the user logged into these) to be taken into account in the data transfer, in that the scheduler controls the data transfer according to priorities from the highest priority to the lowest. The scheduler may also consider the fill level of the browser buffer that is used, in connection with the network speed and/or latency of the connected computers 14, 15, 17, such that the scheduler transfers data more often and for longer periods of time to computers 14, 15, 17 that possess a slower connection and/or higher latency than to computers 14, 15, 17 that possess a faster connection and/or lower latency.

With the method to assemble data to be transferred to a window of a browser 23 and transfer said data at predetermined points in time, the available connection capacity is distributed among multiple windows of browsers 23 in that a window of a browser 23 must wait for an additional data transfer after data have been transferred to it, and in the meanwhile data may be transferred to other windows of browsers 23.

In order to ensure that the printing system 1 or the control system 2 is only operated or set from a user interface, what is known as an "access ticket" is used. Only the user who has the access ticket may make adjustments. The access ticket exists only once in the main computer 10.

The access ticket is administered by the RMI server 33. The access ticket is associated with the web user interface 21, the RMI server 33 or a connected computer 18, 19 at which the control panel is presented without browser support. The access ticket may only be associated with one of these components at a time.

The control system 2 may be accessed by means of a control panel without the access ticket needing to be present only if the printing system 1 is in a standby mode, in which the producing elements (such as the print groups) are deactivated but specific control elements are still in operation.

The web user interface 21 is connected with the main computer 10, which web user interface 21 may have the access ticket and provide functionality for the operation of the printing system 1 or the control system 2 via the browser 23. Since there are multiple browsers 23 connected to the web user interface 21, which browsers 23 may respectively present one or more control panels in sessions, a "session ticket" is provided in order to avoid conflicts.

The session ticket is assigned exclusively by the web user interface 21 and may only be associated with a browser 23 of the computer 14, 15, 17 in a session and is linked to the respective session in which the browser 23 is executed.

The web user interface 21 only receives the access ticket when this is requested via a browser 23. If the web user interface 21 receives the access ticket, the requesting browser 23 then receives a session ticket. A browser that may adjust or operate the printing system 1 or the control system 2 via the web user interface 21 is therefore uniquely identified. As long as the web user interface 21 has the access ticket, one of the browsers 23 may have a session ticket, and the session ticket may be withdrawn from one browser 23 and associated with a different browser 23. A hierarchically structured ticket administration with the subordinate session ticket and the superordinate access ticket is thus provided to avoid conflicts between control panels at different browsers. That the access ticket is associated with the web user interface 21 is a requirement for being able to assign the session ticket. The single exception to this is that the printing system 1 is in standby mode, in which no access ticket is assigned but rather only a session ticket.

Browsers may have a presentation with multiple windows or tabs within the browser. This represents a problem since, although the web sockets 24, 25 and—after the initialization, i.e. after the first display of the control panel—also the session, and thus the browser 23, are identifiable, a single window opened in a browser 23 is not. In order to solve this problem, a unique window ID is respectively associated with the individual window. The session ticket is then hereby associated with the window of the session.

Figure 18:
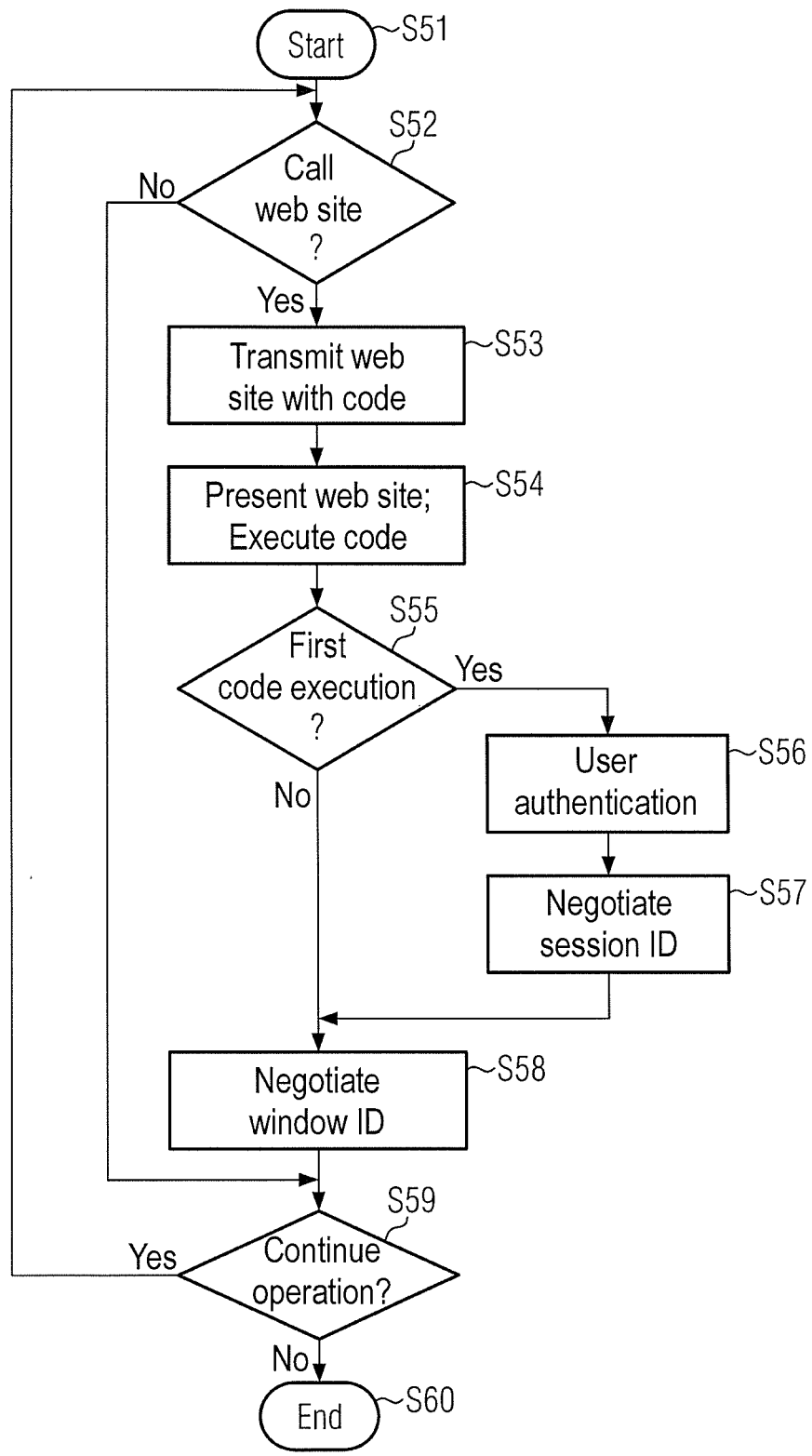
FIG. 18 shows a method to associate a window ID with a window of a browser in a flow chart.

In the following, a method is explained with which a unique window ID is associated with a window of a browser 23 (FIG. 18).

The method begins in step S51. In step S52, a check is made as to whether the user has, with his browser 23, called a login web site (generated by the web user interface 21) in the control panel from a window. The login web site is the first web site that is called in order to connect the browser 23 with the web user interface 21. A calling of the login web site takes place via input of a predetermined network address into an address bar of the browser 23, for example in the form of a URL (uniform resource locator) or IP address. The authentication of the user may be implemented on the login web site in the form of a user login. The web sockets 24, 25 are also initialized with the calling of the login web site.

If it has been established in step S52 that the login web site has been called, the web user interface 21 then transmits the called web site (i.e. the login web site) as a markup language file with the embedded program code 48 that is executed by the (scripting) programming language module 59. In the exemplary embodiment, this embedded program code 48 is a Java code (step S53).

Step S54 then follows, in which the browser 23 of the user receives the transmitted login web site, presents it and executes the embedded program code 48.

Step S55 is subsequently executed, in which a check is made as to whether the code is executed for the first time within the session. For example, this may take place via an access to a data object provided for this in the browser 23, wherein the data object is only initialized after a first access. This has the result that, upon the first access to the data object, an error is triggered that is captured and evaluated. No error is generated upon every further access. The data object is only removed from the browser 23 if the browser 23 is closed.

In the event that the code is executed for the first time, step S56 follows, in which the user authentication is implemented. All authorized users are assigned at least one user identifier or user ID, an associated password or another authentication means, for example a code stored on a chip card, biometric properties etc., and a user role or user group. The user role or user group is provided with user rights that define which actions are allowed for the user and which are not. The main computer 10 may store different user roles and/or user groups with different user rights for association with a user. This information is stored on the main computer 10 in one or more user tables. The user table(s) thereby include(s) information that is linked with the user, his rights and his authentication, for example: user ID; user name; user identifier; password; user role or user group; user rights. The control panel module library 20 and/or the web user interface 21 may access this/ these user table(s). The user authentication occurs in that the user inputs his user identifier and the associated password into the login web site of the control panel in the browser 23. The web user interface 21 receives and reviews this input using the info that is stored in the user table(s). If the user inputs his user identifier with the correct password (i.e. if the user is authorized), the web user interface 21 then assigns the predetermined user role—and therefore the predetermined user rights—to the user, in that it determines this information from the stored user table(s).

Following after this is step S57, in which the session ID is negotiated or is uniquely established for the session. In the event that a communication is implemented in the future, the session (and thus the browser 23) may be identified uniquely via the session ID (and thus the browser 23). The session ID is hereby stored in the web user interface 21, linked together with the user name or the user ID. This enables the web user interface 21 to associate a session with a user in order to be able to in this way conclude the user role or user rights of the session.

Step S58 then follows, in which: the code embedded in the web site reads the negotiated session ID; sends this to the web user interface 21 with the request to generate a unique window ID; receives the unique window ID that was generated by the web user interface 21; and stores said unique window ID in a memory range linked with the window. For example, this memory range may be an invisible data object in the web site opened in the window. The window ID is sent as well in all future communication whose communication channel or web socket is referenced via the session ID. The web user interface 21—just like the code embedded in the web site at the computers 14, 15, 17—thereby recognizes for which window or from which window of the browser 23 the transmitted information are. The window ID is hereby stored in the web user interface 21, linked with the user name or the user ID (just as was explained above for the session ID), such that the web user interface may determine via the window ID the user of the window of the session, and thus his user role or user rights.

Following after this is step S59, in which a check is made as to whether the operation is to be continued. If the operation is not to be continued, step S60 follows in which the method ends. However, in the event that the operation is to be continued, the method workflow transitions back to step S52 after the execution of step S59.

In the event that it is established in step S55 that the code is not executed for the first time, the method workflow then transitions directly to step S58.

With the method explained above for the association of a unique window ID with a window of a browser 23, it is ensured that a window in a web site that is presented in a session at the computers 14, 15, 17 receives a unique window ID. With the aid of the unique window ID it is possible to uniquely associate a session ticket with a window of a browser 23. Additionally, information is stored about which user is logged into the system in which window of a session.

Given the use of windows in browsers 23, the problem results that a window is closed or is no longer capable of reacting (meaning, for example, that the embedded code has crashed), wherein in this moment the session ticket may also be associated with the window, which must inform the web user interface 21 that the respective window with the unique window ID is no longer present.

This problem is solved in that the web user interface 21 cyclically checks, using the unique window ID previously stored in the reference table, whether the window is still open and capable of reacting. For this, the web user interface 21 sends a request to report to (ping) the embedded program code 48 of all windows of the browser 23 that are known to the web user interface 21 in all browsers 23 in all sessions. The web user interface 21 expects an echo from the embedded program code 48 as a response (which embedded program code 48 is executed in the respective window of the browser 23) with the unique ID of the window. If this response with the unique window ID is absent after a predetermined wait time, the web user interface 21 removes this unique window ID from the reference table. It is thereby ensured that windows that are closed or no longer capable of reacting are removed from the reference table.

If a window that is no longer open or capable of reacting has owned a session ticket, the web user interface 21 may decide how to proceed further. There are multiple possibilities for this that are explained in the following:

1. The now released session ticket is automatically assigned to another window of the same browser 23 that previously had the session ticket, in the event that the browser 23 is active in the corresponding session and presents a control panel for the printing system 1 or the control system 2 (same user, same session, same browser 23).

2. The now released session ticket is assigned to another browser 23 of the user that previously had the session ticket, in the event that another browser 23 is active within the corresponding session and presents a control panel (same user, same session, different browser 23).

3. The now released ticket is assigned to another browser 23 of the same user who had the session ticket, wherein the browser 23 runs in another session, in the event that such a browser 23 is active in another session and presents a control panel (same user, different session, different browser 23).

4. The now released session ticket is assigned to another user who is possibly selected according to a user priority. For example, the users are prioritized according to when they have sent a request for a session ticket, wherein the newest or oldest request may have a higher priority (different user, different session, different browser 23).

5. The now released session ticket is passed into a waiting area or a waiting pool for a new request of the session ticket, and thus is returned to the web user interface 21.

If a browser is used that allows only a single window, then no window IDs are necessary. Instead of the window ID, the session ID may then be cyclically monitored, wherein given a browser that is no longer open or a browser that is no longer capable of reacting, the session ticket is assigned or withdrawn similar to the above description.

As already explained above, the access to the printing system 1 or the control system 2 occurs from a browser that is executable on one of the computers 14, 15, 17 to the web user interface 21 via data connections, i.e. simultaneously from various computers 14, 15, 17 and from different users. Care is hereby to be taken that the security rules explained in the following are complied with, which security rules are checked at the main computer 10 upon action requests transmitted from the client computers 14, 15, 17:

- action request only from authorized persons or apparatuses,
- action request only from persons or apparatuses that have sufficient access rights,
- action request only in the event that the respective browser 23 presents a data object that is suitable for execution of the action, and
- action request only if the printing status allows this.

The review of the action request from authorized persons or apparatuses means that an identification of the person or of the apparatus that is included in the action request is checked to the effect of whether the person and/or the apparatus has been properly authorized by the main computer 10 in advance. If such a required authorization is not present, the action request is rejected.

Furthermore, a check can be made as to whether the action request originates only from persons or apparatuses that possess sufficient access rights. The persons or apparatuses listed in the action request are hereby read out, and the access rights stored in their respective role are queried. Action requests that are not covered by the access rights are rejected.

The authorized apparatuses and/or the apparatuses that possess sufficient access rights in particular include the service computers 15, 17. It is thereby ensured that action requests that are security-critical are possibly only from the service computers, and security-critical action requests that originate from the control panel computers 14 are rejected. Requests for actions that affect the security of the printing system (both the hardware and the executable software) and/or of the persons operating at them are called security-critical action requests.

Via the review of the authorization and/or of the sufficient access rights of the persons who initiate security-critical action requests, it is ensured that only the action request of authorized persons are executed, wherein security-critical action requests from unauthorized persons are rejected.

A check may also be made as to whether the action request originates from a data object that is actually presented in the respective browser 23. In the reference table, the data objects are stored with the association with the respective browsers or sessions. The data object ID is included in the action request. This is checked as to whether it is associated with the corresponding browser 23 or the corresponding session and the window. If this is not the case, this means that the data object is not presented and the action request is unauthorized.

Furthermore, a check may be made as to whether the action request is possible in light of the current printer status. Depending on the printer status, specific actions may not be allowed, for example the starting of the paper transport if the housing is opened for service tasks.

All of these different checks are preferably made at every action request that is transmitted from one of the client computers 14, 15, 17 to the main computer 10. In principle, however, it is also possible to review only one or more of the security rules. If a review establishes a violation of one of the security rules, the corresponding action is then blocked.

Manipulations to the web sites or markup language files that are transmitted from the web user interface 21 of the main computer 10 to the respective browser 23 are simultaneously prevented with the aid of this multi-level security concept, since the security rules listed above are checked at every occurring action request. In particular, manipulative changes to the program code 48 of the web sites or markup language files that are stored in the cache of each browser 23 are detected since the web user interface 21 is informed at any time about the data objects presented in the respective browser 23, and thus a check may be made as to whether an action request is plausible at all.

Figure 19:
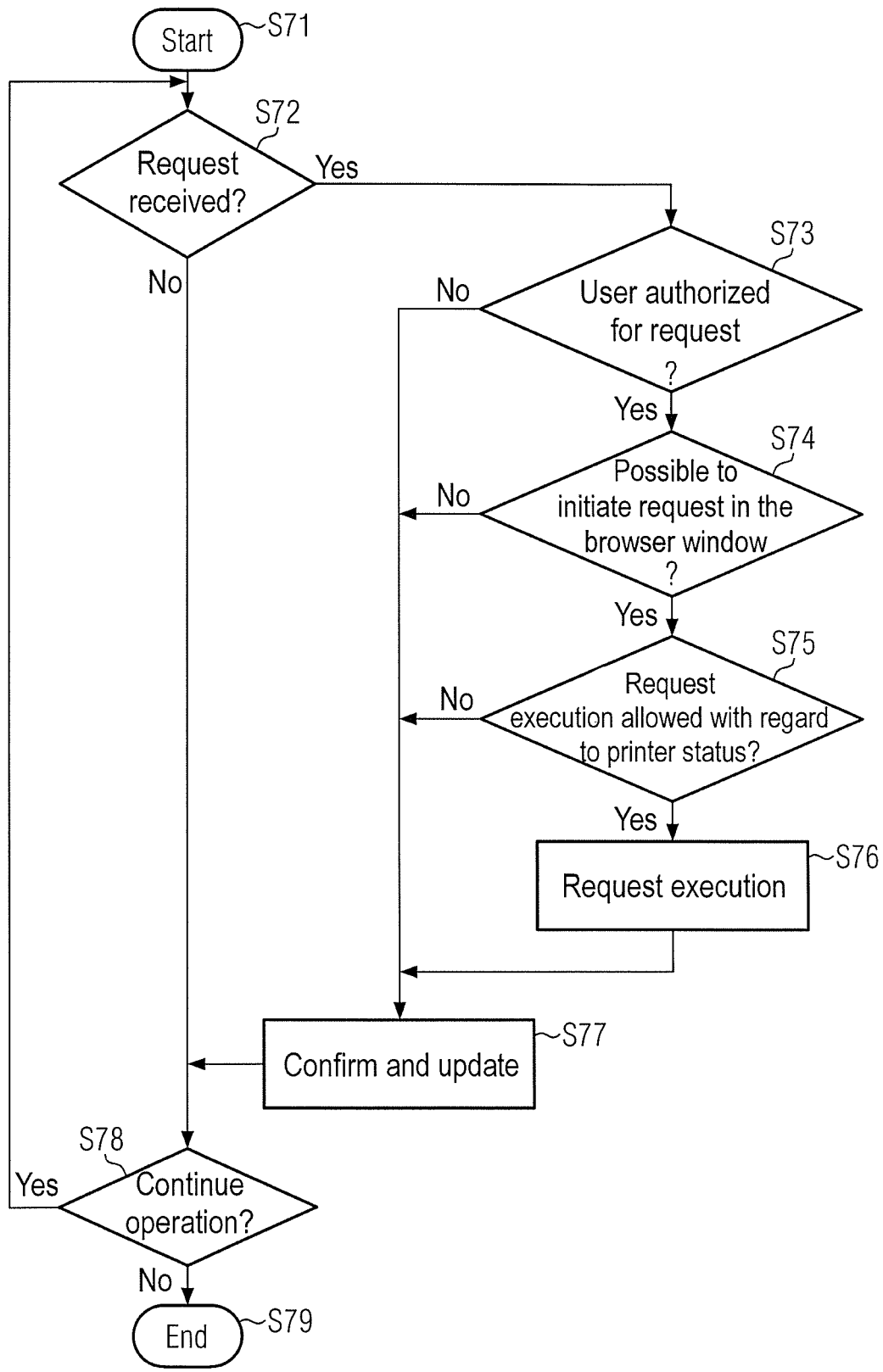
FIG. 19 illustrates a method to review an action request with regard to system security in a flow chart.

In the following, a method is explained for checking an action request with regard to system security, which method realizes the security concept stated above (FIG. 19).

The method begins in step S71. In step S72, a check is made as to whether the web user interface 21 has received an action request of one of the browsers 23. For example, an action request hereby includes a control command for the printing system 1 or the control system 2; a command to change a value; or a command in order to read data, wherein these encompass data of the printing system 1, of the control system 2 or of the web user interface 21, in particular web sites or markup language files. An action request sent by one of the browsers 23 includes: the session ID of the sending browser 23; the window ID of the respective session that is associated with the window from which the action request is sent; the data object via which the action request was triggered; a command code; and additional parameters (for example values) in connection with data objects making the action request etc.

If the web user interface 21 has received an action request, the execution of step S73 then follows, in which a check is made as to whether the user of the browser 23 is authorized for the action request. This check occurs with the aid of the reference table and the user table(s), which have already been explained above. In the reference table, a user ID via which the user of the browser 23 is referenced is associated with the respective session ID of one of the browsers 23 and the window ID of the respective session. A user role is associated with the user ID in the user table(s) on the main computer 10, wherein the respective user role defines which user rights are present. The web user interface 21 determines the user ID from the reference table via the parameters, session ID and window ID that are passed in the action request. Using the user ID, the web user interface 21 determines the user role from the user table(s) and, with the aid of the user role, determines the user rights (i.e. whether the user is authorized for the action request).

If this is the case, then the execution of step S74 follows, in which a check is made using the reference table as to whether the initiation of the action request is possible in the browser 23 via one of the presented display objects. The reference table is always updated by the web user interface 21 when a GUI change event has occurred, as was already explained above. With the aid of the reference table, the web user interface 21 establishes which display objects are currently displayed (and thus operable) in the respective window of the browser 23. The web user interface 21 may thus check whether the initiation of the action request is possible or not in the window of the browser 23.

If the initiation of the action request is possible in the browser 23, the method workflow then transitions to the execution of step S75, in which the control panel library module 20 checks whether the execution of the action request is allowed or not with regard to the printer status. This check in particular serves to prevent the execution of an action request that leads to a hazardous situation for personnel who are working at the printing system 1 or at the control system 2, and/or for the printing system 1 or the control system 2. For example, the take-off 6 and/or the take-up 7 may not be placed in operation if the paper roll is being changed. An additional example is a repair by a repair specialist inside the printing system 1, given which it would be dangerous for the repair specialist to set electrical motors (which serve for the transport of the recording medium) into operation.

If it is established in step S75 that the execution of the action request is allowed with regard to the printer status, then step S76—in which the action request is executed—follows.

The method workflow is then continued with the execution of step S77, in which the web user interface 21 controls the control panel or its display objects and/or displayed values of the browser 23 from which the action request was granted, such that the execution of the action request is confirmed to the user in that this is displayed at the control panel. In this step, control panels of other browsers 23 (that present display objects that are relevant to the execution of the action request, for example) may also be updated.

The execution of step S78 then follows, in which a check is made as to whether the operation is to be continued. If the operation is not to be continued, then step S79 follows in which the method ends. However, if the operation is to be continued, after the execution of step S78 the method workflow transitions to step S72.

If it has been established in step S72 that no action request has been received, the method workflow then transitions directly to step S78.

If it has been established in step S73 that the user is not authorized for the action request, or it is has been established in step S74 that the initiation of the action request is not possible in the browser, or it has been established in step S75 that the execution of the action request is not allowed with regard to the printer status, then the method workflow transitions to step S77 in which an error message is generated as a response, which error message is sent for display to the computer 14, 15, 17 that has transmitted the action request. In this step, control panels of other browsers 23 (which present display objects that are relevant to the dismissal of the action request, for example) may also be updated.

With the method explained above for reviewing an action request with regard to system security, the web user interface 21 checks whether the user is authorized for an action request; whether the initiation of the action request in the browser 23 is possible via one of the presented display objects; and whether the execution of the action request is allowed with regard to the printer status. In the present exemplary embodiment, only when all of the reviewed criteria apply is the transmitted action request executed. If only one of the reviewed criteria does not apply, then the execution of the action request is blocked. The method additionally enables the updating of the user interfaces of browser 23 that are affected by the execution of the action request or it being blocked, in particular of the browser 23 via which the action request was initiated.

Various software testing tools that are provided by development organizations are used in the development of high-capacity digital printers. These software testing tools are created in part by the development organization itself. The software testing tools may be designed to pose action requests to the printing system 1 and/or the control system 2, for example for the execution of actions or for the setting of parameters. Additionally, parameter values may be read from data sources by the software testing tools and be displayed, for example temperature values of a temperature sensor. Normally, these software testing tools or portions thereof must be introduced into the development process of the system software of the printing system as of a specific state of the development of the printing system, meaning that the software testing tools are accepted into the control panel library module 20 and/or into the service module 69 in order to be able to test these for correct functionality.

The problem hereby results that such an acceptance into the system software creates difficulties because

- often the software testing tools and the system software of the printing system are created with or in different programming languages,
- the software testing tools and the system software of the printing system use different interfaces to the printing system,
- the usability of the software testing tools is not adapted to the guidelines of the system software of the printing system, for example with regard to the design of the user interface, of the component behavior, the language etc. and/or
- the security rules that are explained above may (in part) be circumvented, since the standardized interfaces are not used.

Therefore, in order to enable the acceptance of the functionalities provided by the software testing tools into the system software of the printing system, the software routines and/or the user interface normally must be adapted to the requirements or must be recreated according to the requirements.

In order to solve this problem, a method is provided for integrating external test menus. Test menus are hereby reinstalled, modified or adapted or removed as needed, even while the system software of the printing system is being executed. Test menus are menus which are created by different departments of a development organization within the scope of the software development. The term "external" means that the resources that provide the test menus are not a component of the system software of the printing system. The test menus are created on the basis of the framework.

Figure 20:
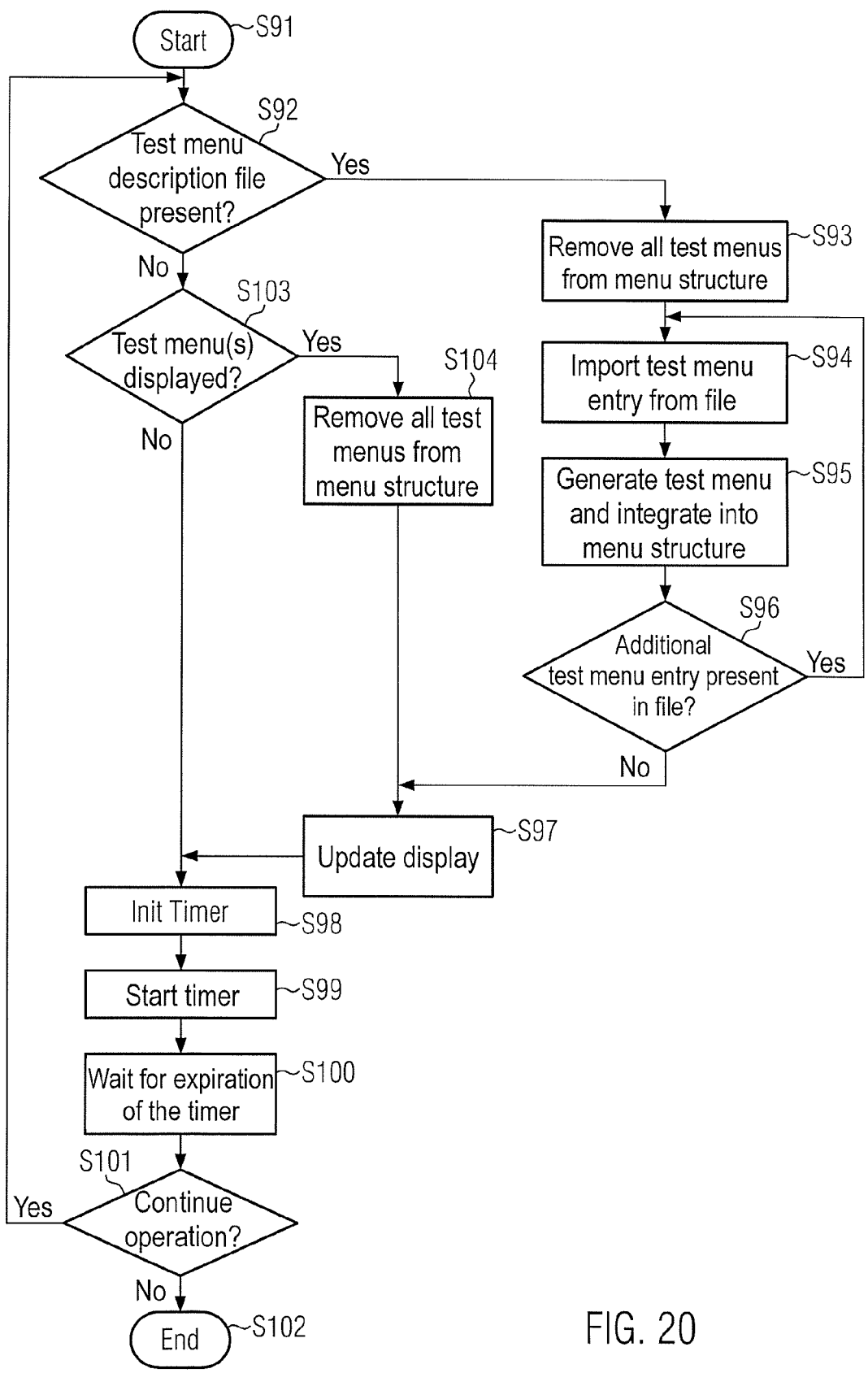
FIG. 20 shows a method to integrate test menus in a flow chart.

In the following, a method is explained for the automatic integration of test menus into the system software of the printing system (FIG. 20).

The method begins in step S91. In step S92, a check is made as to whether a test menu description file is present on the main computer 10, for example because it has been created there or has been copied onto a data medium connected to the main computer 10. The test menu description file is hereby stored in a predetermined storage area, for example in a data folder of a storage medium. Alternatively, the storage area may be predetermined for each browser 22, 23; for each window of a browser 22, 23; for each session in which a browser 22, 23 is executed; for each user; and/or for each of the computers 14, 15, 17, for example in that a data folder of the storage medium is associated with a specific browser; a specific window of a browser; a session; a user; and/or a computer 14, 15, 17.

The test menu description file includes entries that describe the design of one or more test menus. The test menu entries thereby include a test menu ID and/or a test menu name and the names and/or the ID of a menu entry of the control panel to which the test menu is to be appended (i.e. an attachment point), as well as the menu entries of the test menu and the software components and/or resources. A test menu entry describes the design of a complete test menu. Included in the test menu description file is the description for one or more test menu(s), meaning that the test menu description file includes one or more test menu entries. The design of the test menu description file is thereby designed according to the rules and methods that the framework 47 defines or according to the methods, functions, classes, structures and/or extensions that the program code 48 defines.

If a test menu description file is present, step S93 is executed in that all displayed test menus are removed from the menu structure. The menu structure is a data structure on the main computer 10 that represents the menu design. Such a menu structure is preferably stored in a table or in multiple tables whose entries have relations to one another. However, it may also be stored in another suitable data structure, for example as a linked list, in a tree structure etc.

Step S94 then follows, in which a (first) test menu entry is imported from the test menu description file. If step S94 is executed after step S93, a first entry of a test menu is then imported from the test menu description file. However, if the execution of step S94 precedes the execution of another step, this is explained further below.

The execution of step S95 subsequently follows, in which the test menu read in step S94 is generated with its components according to the test menu entry and is integrated into the existing menu structure. The test menu is hereby appended to the existing menu structure at the attachment point specified in the test menu description file or is connected with the existing menu structure at the attachment point.

The method workflow then transitions to step S96, in which a check is made as to whether an additional test menu entry is present in the test menu description file. If an additional test menu entry is present, step S94 is executed again. In step S94, the next test menu entry is hereby imported from the test menu description file. However, if an additional test menu entry is not present, then the execution of step S97 follows, in which the display is updated. Upon updating the display, the menu structure is completely read and inserted into the control panel structure that is received from the web user interface 21 and translated into a control panel file, as was already explained above. The menu structure is hereby a part of the control panel file that is transmitted in the predetermined markup language to the corresponding browser 22, 23 for display of the control panel.

Step S98 is then executed, in which a timer is initialized that is associated with a session in which the browser 22, 23 is executed, and if present with the corresponding window of the browser 22, 23. With the initialization the timer is set to a value that corresponds to a time interval that is to be waited before a check is made again as to whether a test menu description file is present. The value of the wait period may hereby be between 1 ms and 1 min. For example, the timer is loaded with a value that corresponds to 1 s.

The timer is subsequently released and begins to run (step S99).

In the following step S100, a wait occurs for a timer interrupt that is triggered by the timer after expiration of the time interval (of 1 s, for example). The waiting in step S100 is executed such that other processes may be executed in parallel at the main computer 10.

If the timer interrupt has occurred, then step S101 is executed, in which a check is made as to whether the operation is to be continued. If the operation is not to be continued, then step S102 follows in which the method ends. However, if the operation is to be continued, the method workflow transitions to step S92 after execution of step S101.

If it is established in step S92 that no test menu description file is present, the execution of step S103 then follows, in which a check is made as to whether test menus are displayed in the browser 22, 23. This is checked using the entries in the menu structure that represent the test menus.

If such entries for test menus are present in the menu structure, then all such entries are removed from the menu structure in step S104. The method workflow then transitions to step S97.

However, if it is established in step S103 that no test menus are displayed—meaning that no entries that represent the test menus are found in the menu structure—the execution of step S98 then follows.

With the method explained above for the integration of test menus into a menu structure that is presented in the control panel displayed by the browser 22, 23, software routines that were originally developed as software testing tools may be integrated in an uncomplicated manner into the system software of the printing system at run time so as to be executable, such that software routines can be called via the displayed menu structure. It is hereby achieved that

- the software development is significantly simplified via simple and fast testing of software routines,
- employed interfaces are standardized, in particular via the creation of the test menu according to the framework 47,
- the displayed test menu and the software components executable via its menu entries are subjected to the security rules explained above or may be subjected to these insofar as they trigger security-critical action request,
- the changing or integration of a menu structure takes place in the sense of a remote access for the browsers 22, 23 since this occurs centrally at the main computer 10,
- the resources used by the test menus are integrated dynamically at run time, and
- test menus of partner firms participating in the software development, including their software routines, are also simple to integrate in the event that the programming of the test menus by partner firms takes place according to the corresponding programming specifications according to which the test menus are to be created.

The check as to whether test menus that are to be presented are present is thereby implemented cyclically in defined time intervals. It is particularly advantageous that created software components may be integrated and tested in a production printing system or in a printing system that is operated for testing purposes, and that software components that are accepted later into the system software of the printing system are already tested in advance for correct functionality.

In the exemplary embodiments explained above, tables are used as data structures. These tables are examples. The tables may also be structured differently, wherein tables are divided up into multiple tables or multiple tables are merged into one common table, or specific parameter sets are stored in another table. The relationships or relations of the parameters used in the exemplary embodiments among one another is significant to the invention. Instead of tables, any other data structures may also be used for this, for example databases, lists or hierarchical data structures such as tree structures, for example.

In principle, all method steps that are explained above for the or with the browser 23 may also be executed for the or with the browser 22 at the main computer 10.

The present one exemplary embodiment concerns a method for operating a control panel for a production system, in particular for a printing system. The production system has a control system 2 that comprises a main computer 10. The main computer 10 is connected via a data connection with one or more client computers 14, 15, 17 on which a browser 23 is executed. The control panel for the production system is displayed in the respective browser 23. Via an operation of a user at the control panel, an action request is triggered at a web user interface 21, with which an action is requested at the main computer 10. Upon every action request, the web user interface 21 checks according to predetermined rules whether this action is allowed, and blocks the action if it is not allowed.

Although preferred exemplary embodiments are shown and described in detail in the drawings and in the preceding specification, they should be viewed as purely exemplary and not as limiting the invention. It is noted that only preferred exemplary embodiments are shown and described, and all variations and modifications that presently or in the future lie within the protective scope of the invention should be protected.

REFERENCE LIST 1 printing system
2 control system
3 print group
4 printing system controller
5 print group controller
6 take-off
7 take-up
8 print server
9 internal LAN
10 main computer
11 raster computer
12 interface computer
13 optical waveguide
14 control panel computer
15 service computer
16 router
17 service computer
18 printer control panel computer
19 remote control module
20 control panel library module
21 web user interface
22 browser
23 browser
24 web socket
25 web socket
26 operating system
27 function code
28 infrastructure manager
29 web user interface database
30 web user interface plugins
31 trace module
32 DE agent
33 RMI server
34 ORS agent
35 trace agent
36 web server module
37 system parameter manager
38 SEA agent
39 OP master
40 UIC agent
41 TR file collector
42 Ops-PAC
43 RDP agent
44 error agent
45 CDC agent
46 web server
47 framework
48 program code
49 external plugins
50 external libraries
51 web server services
52 views
53 controllers
54 IsMa service
55 menu service
56 push helper service
57 RMI service
58 scheduler service
59 (scripting) programming language module
60 markup language module
61 document access interface
62 design language module
63 print group control driver
64 main module
65 paper transport module
66 a printer module
67 SNMP service
68 control panel user interface
69 service module
111, 111a-111d print group (front side)
112, 112a-112d print groups (back side)
120 recording medium
121 roll (input)
123 conditioning group
124 turner
125 register
126 drawing plant
128 roll (output)
130 fixer
140 climate control fixer module
150 power supply
170 fluid management
171 fluid control
172 reservoir

We claim as our invention:

1. A method for operating a control panel for a production system wherein the production system has a control system that comprises a main computer connected via a data connection with at least one client computer on which a respective browser is installed and executed, comprising the steps of:

providing and executing a control panel library module on the main computer to generate and provide the control panel for the production system;

transmitting the control panel as a markup language file from the main computer to the respective browser and executing the control panel in the respective browser to present the control panel;

transmitting the markup language file from the main computer to the at least one client computer by means of a web user interface installed and executed on the main computer;

by an operation of a user at the control panel triggering an action request at the web user interface with which an action is requested at the main computer; and upon every action request, the web user interface checking according to predetermined rules if said action request is allowed, and if the action is not allowed the action request is blocked.

2. The method of claim 1 wherein the production system comprises a printing system.

3. The method according to claim 2 wherein the action request comprises at least one of a menu action that is executed at the web user interface and a control action with which settings at the printing system are modified.

4. The method according to claim 1 wherein upon every action request the web user interface checks whether said action request is possible via the control panel presented in the browser, and blocks the action request if the action request is not possible via the control panel.

5. The method according to claim 1 wherein the control panel library module checks the predetermined rules, using a rule system, as to whether specific control actions may be executed in a respective current state of the production system, and said specific control actions are blocked if they may not be executed.

6. The method according to claim 5 wherein the predetermined rules of the rule system include at least one of the following security rules:

action requests may only be placed by authorized persons or apparatuses;

action requests may only be placed by persons or apparatuses that have sufficient access rights;

action requests may only be placed if the respective browser presents a data object that is suitable for execution of the action, and action requests may only be placed if a status of the production system allows the action request.

7. The method according to any of the claim 1 wherein upon reviewing an action request, an identification of at least one of the user, a session, and a window in which the control panel is executed is extracted, and using said identification the user is identified who has triggered the action request, wherein rights associated with the user are determined and using said rights a check is made as to whether the requested action may be executed.

8. The method according to claim 1 wherein the user must respectively be registered or authorized upon every initialization of the control panel in the browser, upon reviewing an action request, the identification of at least one of the browser, the user, the session and of the window in which the control panel is executed is extracted, and using said identification the user is identified who has triggered the action request, wherein a check is made as to whether the user has been properly registered or authorized.

9. The method according to claim 1 wherein the control panel has at least one display object that is respectively a self-contained element of the control panel that serves for display of a specific value of a respective parameter, and at the main computer a reference table is stored with which a relationship between each display object and at least one of the browsers, the windows, and the sessions is established, wherein using the reference table a check is made as to which display objects are displayed in the respective browser and thus are operable, and the action is blocked if it is established that the display object from which the action request emanates is not presented.

10. The method according to claim 1 wherein an error message or warning message is transmitted to at least one of the browser from which the action request has been initiated and another control panel.

11. The method according to claim 10 wherein the warning message is transmitted to a user with higher rights than those of a user who has initiated the action request.

12. The method according to claim 1 wherein the web user interface and the respective browser communicate by means of web sockets, and wherein one of the web sockets at the web user interface and another of the web sockets at the browser are coupled so that a permanent logical data connection is formed between the web user interface and the respective browser.

13. A control system for a production system, comprising:

a main computer connected via a data connection with at least one client computer on which a respective browser is installed and executable;

a control panel library module installed and executable at the main computer and which generates and provides a control panel for the production system, said control panel being transmitted as a markup language file from the main computer to the respective browser and executed in the browser to present said control panel;

a web user interface installed and executed on the main computer for transmitting the markup language file from the main computer to the at least one client computer;

the web user interface by an operation of a user at the control panel triggering an action request with which an action is requested at the main computer; and said web user interface upon every action request checking according to predetermined rules if said action request is allowed, and if the action is not allowed the action request is blocked.

14. The control system of claim 13 wherein the production system comprises a printing system.

15. A method for operating a control panel for a production system wherein the production system has a control system that comprises a main computer connected via a data connection with at least one client computer on which a respective browser is installed and executed, comprising the steps of:

providing a control panel library module on the main computer to generate the control panel for the production system;

transmitting the control panel as a markup language file from the main computer to the respective browser and executing the control panel in the respective browser to present the control panel;

transmitting the markup language file from the main computer to the at least one client computer by means of a web user interface installed on the main computer;

by an operation of a user at the control panel triggering an action request at the web user interface with which an action is requested at the main computer; and for the action request, the web user interface checking according to predetermined rules if said action request is allowed, and if the action is not allowed the action request is blocked.

16. A control system for a production system, comprising:

a main computer connected via a data connection with at least one client computer on which a respective browser is installed;

a control panel library module installed at the main computer and which generates and provides a control panel for the production system, said control panel being transmitted as a markup language file from the main computer to the respective browser and executed in the browser to present said control panel;

a web user interface installed on the main computer for transmitting the markup language file from the main computer to the at least one client computer;

the web user interface by an operation of a user at the control panel triggering an action request with which an action is requested at the main computer; and said web user interface for said action request checking according to predetermined rules if said action request is allowed, and if the action is not allowed the action request is blocked.

* * * * *